(12) United States Patent
Fouquet et al.

(10) Patent No.: US 8,384,663 B2
(45) Date of Patent: *Feb. 26, 2013

(54) POSITION DETERMINATION UTILIZING A CORDLESS DEVICE

(75) Inventors: Julie E. Fouquet, Portola Valley, CA (US); Richard Earl Haven, Sunnyvale, CA (US); John Stewart Wenstrand, Menlo Park, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 431 days.

This patent is subject to a terminal disclaimer.

(21) Appl. No.: 12/559,298

(22) Filed: Sep. 14, 2009

(65) Prior Publication Data

US 2010/0001950 A1  Jan. 7, 2010

Related U.S. Application Data

(62) Division of application No. 11/111,444, filed on Apr. 21, 2005, now Pat. No. 7,609,249.

(51) Int. Cl.
*G09G 5/00* (2006.01)

(52) U.S. Cl. ............... 345/156; 356/615; 341/20

(58) Field of Classification Search ........... 345/156–181
See application file for complete search history.

(56) References Cited

U.S. PATENT DOCUMENTS

| | | | |
|---|---|---|---|
| 3,771,857 A | 11/1973 | Thomasson et al. |
| 4,709,580 A | 12/1987 | Butts |
| 4,823,170 A | 4/1989 | Hansen |
| 4,867,570 A | 9/1989 | Sorimachi et al. |
| 4,876,165 A | 10/1989 | Brewer et al. |
| 5,072,109 A | 12/1991 | Aguilera, Jr. et al. |
| 5,148,016 A | 9/1992 | Murakami et al. |
| 5,207,003 A | 5/1993 | Yamada et al. |
| 5,258,618 A | 11/1993 | Noble |
| 5,267,014 A | 11/1993 | Prenninger |
| 5,514,888 A | 5/1996 | Sano |
| 5,530,774 A | 6/1996 | Fogel |
| 5,719,954 A | 2/1998 | Onda |
| 5,760,748 A | 6/1998 | Beckingham |

(Continued)

FOREIGN PATENT DOCUMENTS

| | | |
|---|---|---|
| EP | 0024876 | 10/1982 |
| EP | 0329540 | 8/1989 |

(Continued)

OTHER PUBLICATIONS

Ebisawa, Yoshinobu et al., "Effectiveness of Pupil Area Detection Technique using Two Light Sources and Image Difference Method", XP 000452857 Oct. 28, 1993, 1-2.

(Continued)

*Primary Examiner* — Duc Dinh

(57) ABSTRACT

A system for generating position information includes a reflector, an image collection system, and a processor. The image collection system is configured to collect at least two sets of image data, where one set of image data includes a stronger indication of the reflector than the other set of image data. The two sets of image data can be collected in many different ways and may include using a retroreflector as the reflector. The two sets of image data are used to generate position information related to the reflector. In particular, position information related to the reflector is generated by taking the difference between the two set of image data. Because one set of image data includes a stronger indication of the reflector than the other set of image data, the difference between the two sets of image data gives a definitive indication of the reflector's position.

8 Claims, 24 Drawing Sheets

U.S. PATENT DOCUMENTS

| | | | |
|---|---|---|---|
| 5,901,257 A | 5/1999 | Chen et al. | |
| 6,134,507 A | 10/2000 | Markey et al. | |
| 6,243,491 B1 | 6/2001 | Andersson | |
| 6,285,959 B1 | 9/2001 | Greer et al. | |
| 6,313,825 B1 | 11/2001 | Gilbert | |
| 6,473,189 B1 | 10/2002 | Reedy | |
| 6,509,575 B1 * | 1/2003 | Nanni | 250/559.05 |
| 6,539,239 B1 | 3/2003 | Loughran | |
| 6,559,935 B1 | 5/2003 | Tew | |
| 6,567,078 B2 * | 5/2003 | Ogawa | 345/179 |
| 6,750,848 B1 | 6/2004 | Pryor et al. | |
| 6,788,813 B2 | 9/2004 | Cooper | |
| 6,822,220 B2 | 11/2004 | Lesniak | |
| 6,934,037 B2 | 8/2005 | DePue et al. | |
| 7,012,695 B2 | 3/2006 | Maier | |
| 7,015,894 B2 * | 3/2006 | Morohoshi | 345/156 |
| 7,064,782 B1 | 6/2006 | Spencer | |
| 7,180,044 B2 | 2/2007 | Yu | |
| 7,205,521 B2 | 4/2007 | Gruhlke et al. | |
| 7,242,388 B2 * | 7/2007 | Lieberman et al. | 345/158 |
| 7,257,278 B2 | 8/2007 | Burks et al. | |
| 7,755,608 B2 * | 7/2010 | Chang et al. | 345/157 |
| 2001/0016053 A1 | 8/2001 | Dickson et al. | |
| 2001/0035949 A1 | 11/2001 | Epstein et al. | |
| 2002/0036617 A1 | 3/2002 | Pryor | |
| 2002/0051116 A1 | 5/2002 | Van Saarloos | |
| 2002/0060783 A1 | 5/2002 | Aoyama | |
| 2002/0190254 A1 | 12/2002 | Turner et al. | |
| 2004/0017473 A1 | 1/2004 | Marks | |
| 2004/0046736 A1 | 3/2004 | Pryor et al. | |
| 2004/0070509 A1 | 4/2004 | Grace et al. | |
| 2005/0273011 A1 | 12/2005 | Hattery et al. | |

FOREIGN PATENT DOCUMENTS

| | | |
|---|---|---|
| EP | 1452127 | 4/2004 |
| EP | 1516654 | 3/2005 |
| EP | 1526355 | 4/2005 |
| JP | 6249616 | 1/2001 |
| WO | WO-8702484 | 4/1987 |

OTHER PUBLICATIONS

Ebisawa, Y. et al., "Unconstrained Pupil Detection Technique Using Two Light Sources and the Image Difference Method", XP-002052717, 79-89.

Morimoto, Carlos H. et al., "Real-Time Multiple Face Detection Using Active Illumination", *IEEE*, 0-7695-0580-5/00 2000, 8-13.

\* cited by examiner

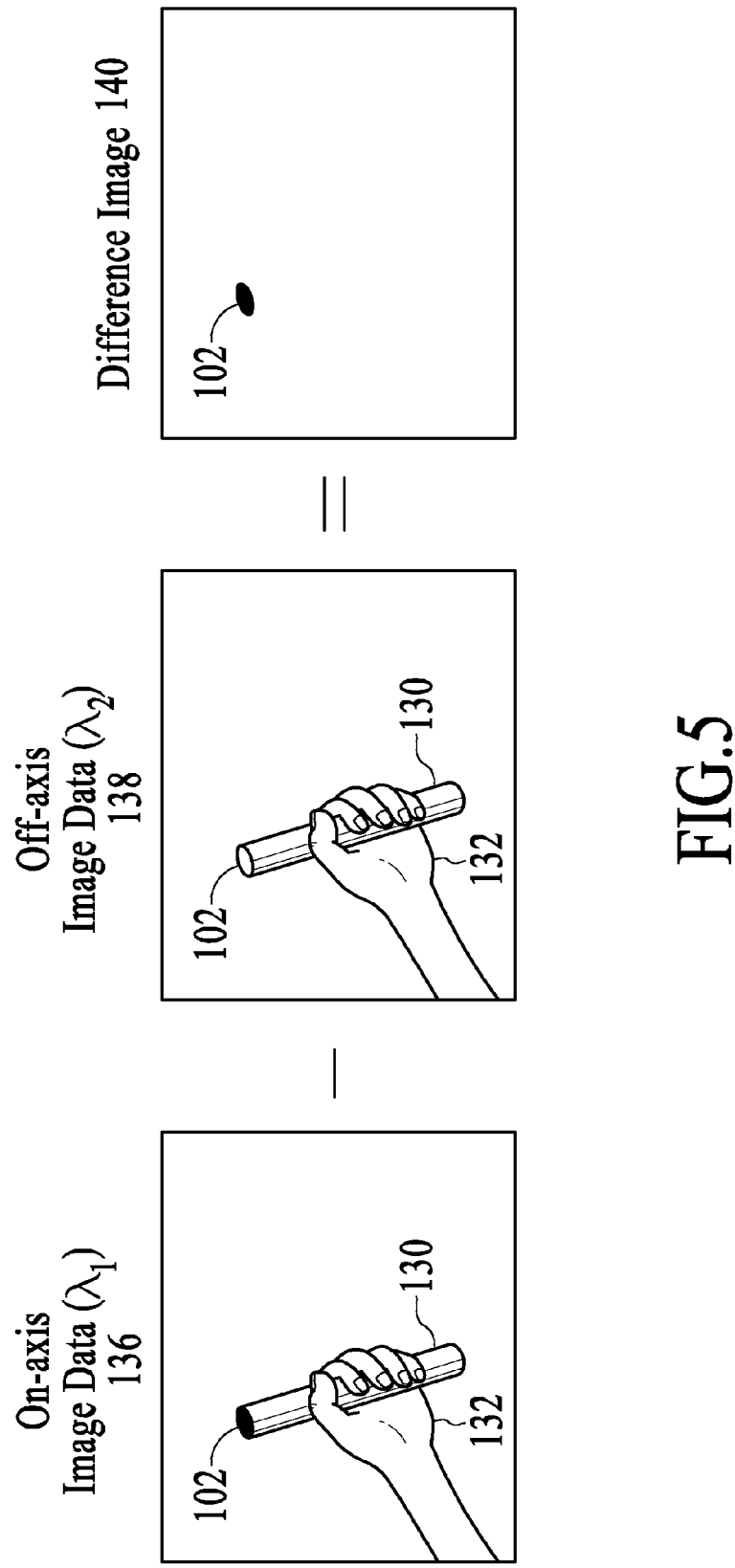

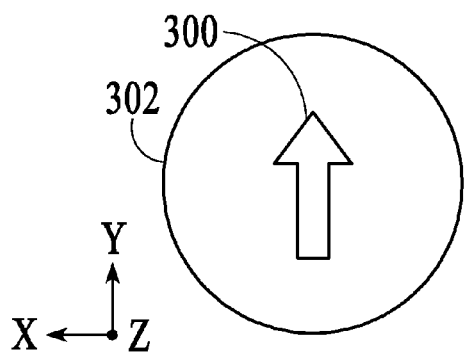 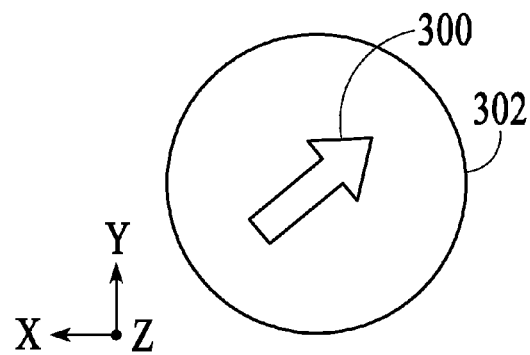
FIG.25A  FIG.25B
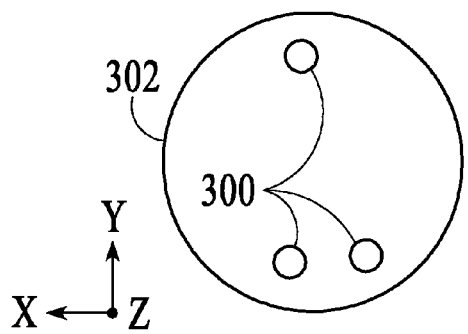 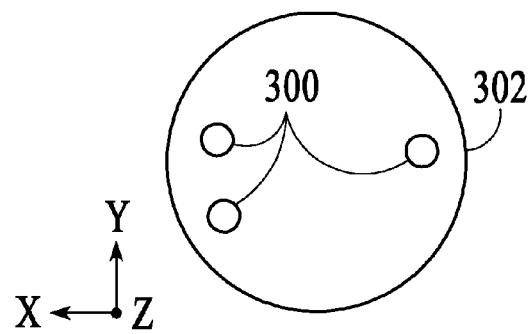
FIG.26A  FIG.26B
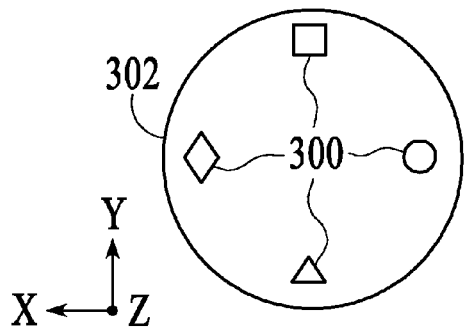 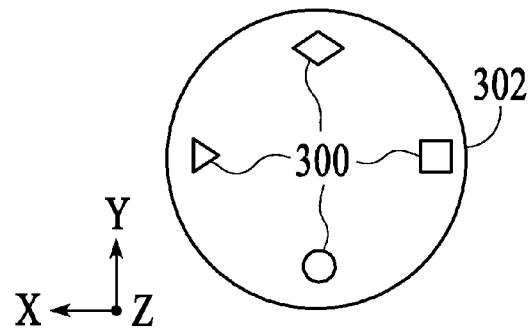
FIG.27A  FIG.27B

POSITION DETERMINATION UTILIZING A CORDLESS DEVICE

CROSS-REFERENCE TO RELATED APPLICATIONS

This is a divisional of patent application Ser. No. 11/111,444, filed Apr. 21, 2005, now U.S. Pat. No. 7,609,249, which is incorporated by reference herein.

BACKGROUND OF THE INVENTION

Most position tracking systems used with a graphical user interface (GUI) utilize a mouse to generate two-dimensional position information. The mouse is typically tethered to the computer by an electrical cord through which power is provided from the computer to the mouse and position information is provided from the mouse to the computer. A cordless mouse utilizes a rechargeable or replaceable battery as its power source and radio frequency (RF) signals to communicate position information to the computer. While conventional position tracking systems work well, the electrical cord of a corded mouse can restrict a user's freedom of movement and the power source of a cordless mouse requires constant recharging or replacement.

In addition to the above-described limitations, a conventional mouse only provides two-dimensional position information. Three-dimensional position information and orientation information are desirable in some position tracking applications.

SUMMARY OF THE INVENTION

A system for generating position information includes a reflector, an image collection system, and a processor. The image collection system is configured to collect at least two sets of image data, where one set of image data includes a stronger indication of the reflector than the other set of image data. The two sets of image data can be collected in many different ways and may include using a retroreflector as the reflector. The two sets of image data are used to generate position information related to the reflector. In particular, position information related to the reflector is generated by taking the difference between the two set of image data. Because one set of image data includes a stronger indication of the reflector than the other set of image data, the difference between the two sets of image data gives a definitive indication of the reflector's position.

The two sets of image data nominally cancel each other out at most corresponding data points except the data points which are related to the reflector. Because it is unlikely that the two sets of image data will exactly cancel each other out, a pre-established difference threshold value can be used to identify and separate the insignificant difference values (i.e., the difference values that do not correspond to the reflector) from the significant difference values (i.e., the difference values that do correspond to the reflector).

The use of a reflector and an image collection system enables two or three dimensional position information to be generated using a passive pointing device that does not require any power. Therefore, the pointing device does not need to be tethered to a computer system or equipped with a battery. The position of the pointing device can be tracked while the pointing device is moved in free space.

Other aspects and advantages of the present invention will become apparent from the following detailed description, taken in conjunction with the accompanying drawings, illustrated by way of example of the principles of the invention.

BRIEF DESCRIPTION OF THE DRAWINGS

FIG. 5 illustrates the basic operation of the system of FIG. 1.

FIGS. 25A and 25B depict an example of a retroreflector that has an orientation-specific shape.

FIGS. 26A and 26B depict an example of multiple retroreflectors configured in an orientation-specific pattern on the surface of a pointing device.

FIGS. 27A and 27B depict an example of multiple retroreflectors that have different shapes.

Throughout the description similar reference numbers may be used to identify similar elements.

DETAILED DESCRIPTION

A system for generating position information includes a reflector, an image collection system, and a processor. The image collection system is configured to collect at least two sets of image data, where one set of image data includes a stronger indication of the reflector than the other set of image data. The two sets of image data are used to generate position information related to the reflector. In particular, position information related to the reflector is generated by taking the difference between the two sets of image data. Because one set of image data includes a stronger indication of the reflector than the other set of image data, the difference between the two sets of image data gives a definitive indication of the reflector's position.

Figure 1:
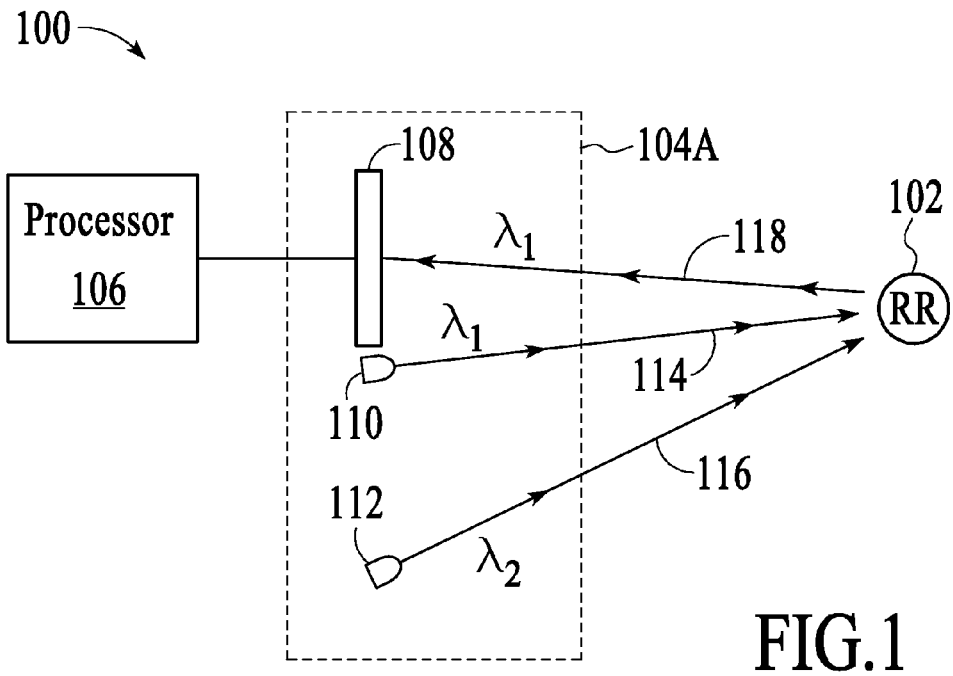
FIG. 1 depicts a system for generating position information that includes a retroreflector, an image collection system, and a processor.

FIG. 1 depicts a system 100 for generating position information that includes a retroreflector 102, an image collection system 104A, and a processor 106. In the embodiment of FIG. 1, the image collection system includes an imager 108 and first and second light sources 110, 112 that output light 114, 116 having different wavelengths. The first light source 110 is located closer to the imager than the second light source 112 and the two light sources and the imager are located in the same plane. The first light source is referred to herein as the "on-axis" light source and the second light source is referred to herein as the "off-axis" light source.

Figure 2:
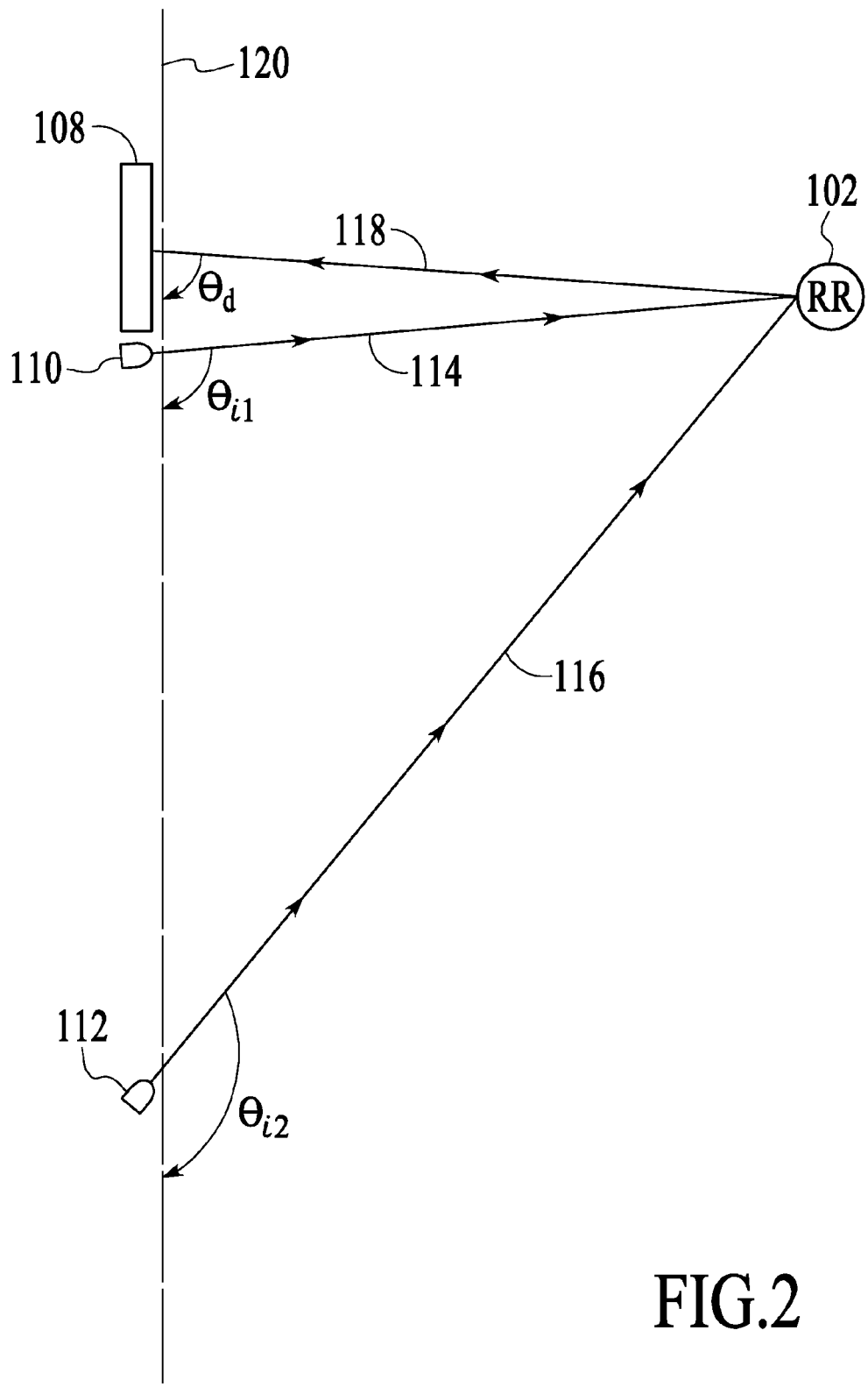
FIGS. 2 and 3 illustrate the detection angle, the on-axis illumination angle, and the off-axis illumination angle in the image collection system of FIG. 1.

The terms "on-axis" and "off-axis" as used herein are described with reference to FIGS. 2 and 3. The angle at which light from a light source illuminates the retroreflector 102 is referred to as the illumination angle. Referring to FIG. 2, the illumination angle is measured relative to a plane (as indicated by dashed line 120) that is coplanar with the plane of the major surface of the imager 108. The illumination angle of light source 110 is identified as $\theta_{i1}$ and the illumination angle of light source 112 is identified as $\theta_{i2}$. The angle at which light 118 reflected from the retroreflector is incident on the imager is referred to as the detection angle. The detection angle is identified as $\theta_d$ and is measured relative to the same plane as the illumination angle. In the case of two illumination angles, $\theta_{i1}$ and $\theta_{i2}$, the term "on-axis" applies to the light source or the illuminating beam whose illumination angle has the smaller difference from the detection angle, $\theta_d$, and the term "off-axis" refers to the light source or the illumination beam whose illumination angle has the largest difference from the detection angle. Referring to FIG. 2, the relationship of the illumination and detection angles is mathematically expressed as: $|\theta_{i1}-\theta_d|<|\theta_{i2}-\theta_d|$.

Figure 3:
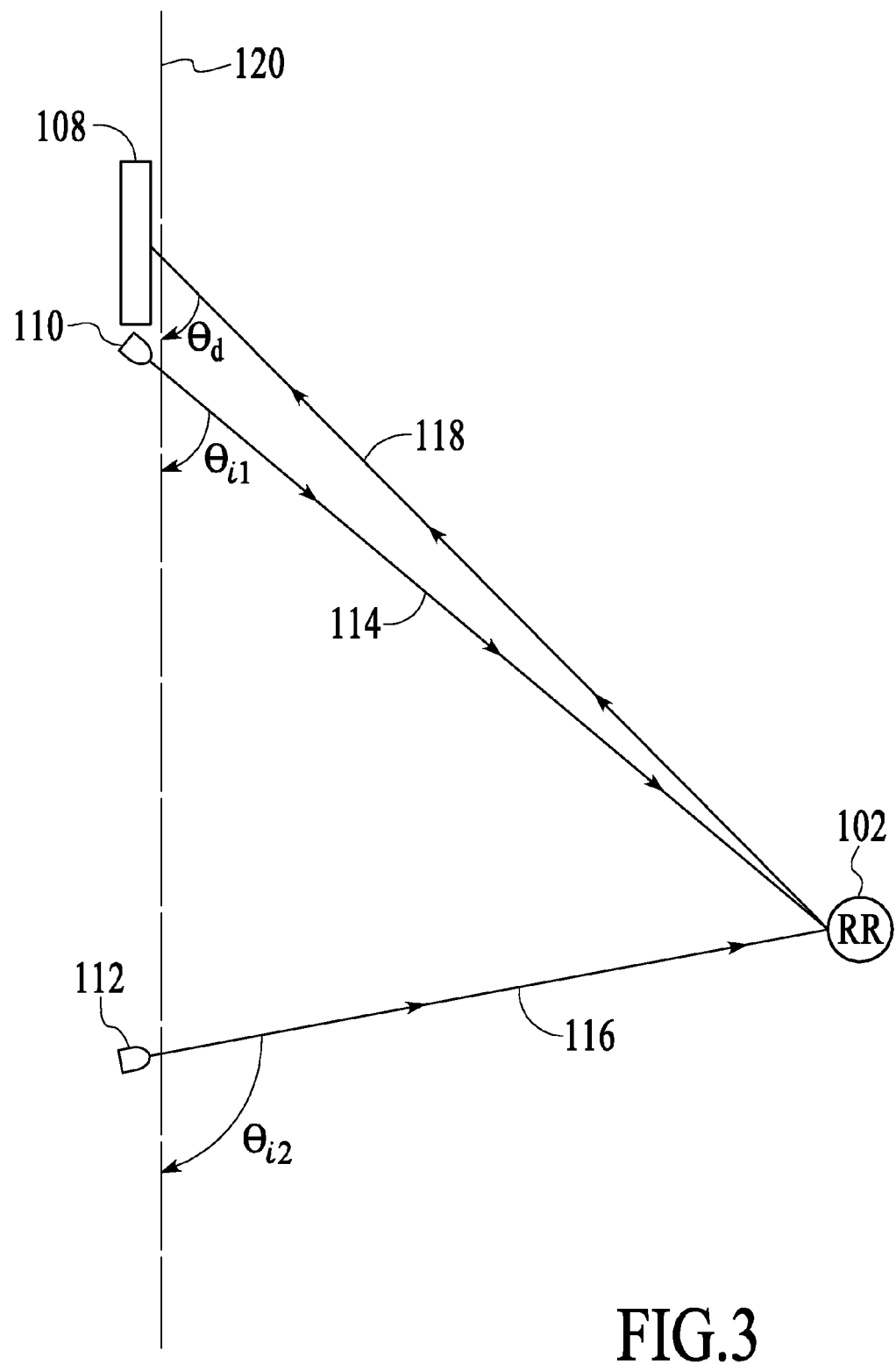

FIG. 3 illustrates changes in the illumination and detection angles that occur as the retroreflector 102 moves relative to the imager 108 and the two light sources 110, 112. Although the illumination and detection angles change as the retroreflector moves, the difference between the on-axis illumination angle and the detection angle remains smaller than the difference between the off-axis illumination angle and the detection angle, $|\theta_{i1}-\theta_d|<|\theta_{i2}-\theta_d|$. Given this relationship between the illumination and detection angles, the status of a light source as an on-axis light source or an off-axis light source does not change with movement of the retroreflector. It should be noted that this relationship is still maintained when the retroreflector is moved in a direction having a component perpendicular to the plane of the figure.

Figure 4:
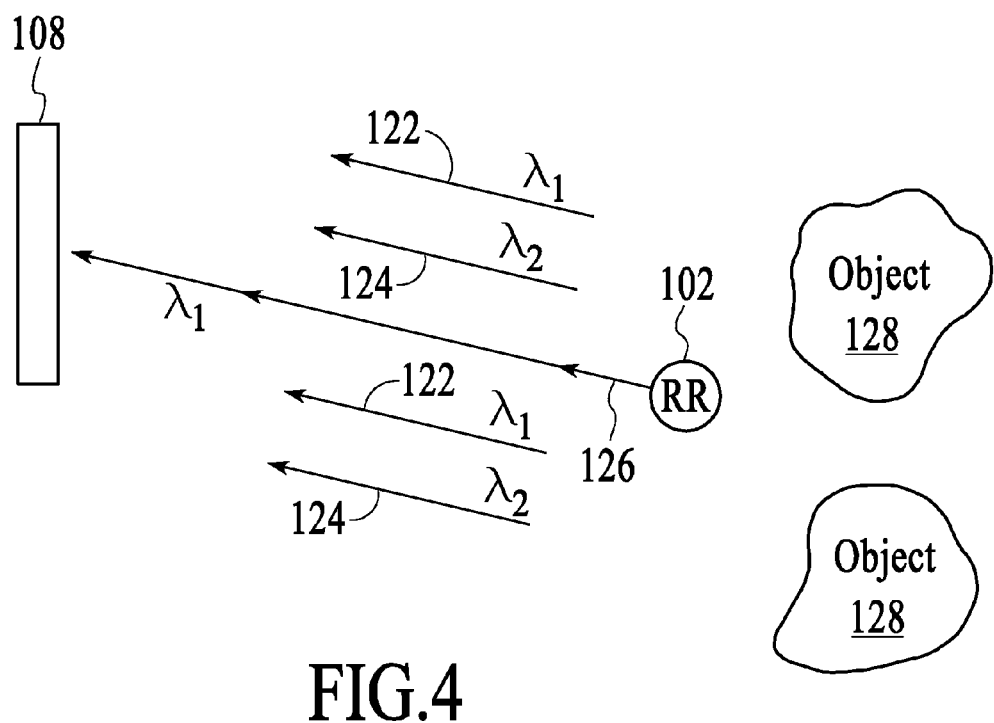
FIG. 4 depicts light of wavelength $\lambda 1$ and wavelength $\lambda 2$ that is incident on an imager after reflecting off of a retroreflector and any miscellaneous objects.

Referring back to FIG. 1, the image collection system 104A is used to collect at least two sets of image data. The first set of image data is collected in response to light at wavelength $\lambda 1$ generated by light source 110 and the second set of image data is collected in response to light of wavelength $\lambda 2$ generated by light source 112. The first set of image data, referred to herein as the on-axis image data, is representative of light of wavelength $\lambda 1$ that reflects off the retroreflector 102 and any other objects that are illuminated by light source 110. The second set of image data, referred to herein as the off-axis image data, is representative of light of wavelength $\lambda 2$ that reflects off the retroreflector and any other objects that are illuminated by light source 112. Because the on-axis illumination angle is closer to the detection angle than the off-axis illumination angle, the on-axis image data will include a stronger indication of the retroreflector relative to the off-axis image data. In this case, the intensity of light reflected by the retroreflector to the imager 108 will be much greater at wavelength λ1 than at wavelength λ2. Therefore, the intensity values at data points related to the retroreflector will be higher in the on-axis image data than at corresponding data points in the off-axis image data. FIG. 4 depicts light 122, 124, 126 of wavelength λ1 and wavelength λ2 that is incident on the imager after reflecting off the retroreflector and other objects 128. While the intensity of light 126 reflected by the retroreflector to the imager will be much greater at wavelength λ1 than at wavelength λ2, the intensity of light 122, 124 reflected by the other objects will be roughly the same assuming that the intensity of the light emitted by the two light sources is roughly equal.

The difference in the intensities of light that is reflected from the retroreflector 102 at the two wavelengths is used to generate position information. The basic operation of the system of FIG. 1 is described with reference to FIG. 5. In FIG. 5, a retroreflector 102 is connected to a pointing device 130 that is held in a hand 132. The hand, pointing device, and retroreflector are illuminated by light sources 110 and 112 from FIG. 1. On-axis and off-axis image data 136, 138 are collected by the imager while the objects are illuminated by the respective light sources. As illustrated in FIG. 5, the on-axis image data 136 includes light that reflects off the hand, the pointing device, and the retroreflector. Because the illumination angle at wavelength λ1 and the detection angle are similar, the on-axis image data includes a strong indication of light from the retroreflector. The strong indication of light is represented in FIG. 5 by a dark spot. The off-axis image data 138 also includes light that reflects off the hand, the pointing device, and the retroreflector. However, because the off-axis image data is obtained in response to off-axis light, the intensity of the off-axis light that reflects off the retroreflector towards the imager 108 is small compared to the intensity of the on-axis light that reflects off the retroreflector towards the imager. Therefore, in the off-axis image data, the retroreflector does not appear significantly brighter than any of the other objects.

In comparing the on-axis image data 136 to the off-axis image data 138, the only significant difference between the two data sets (assuming the data sets are captured simultaneously or nearly simultaneously) is the indication of the retroreflector 102. In view of this, the position of the retroreflector can be definitively identified by taking the difference between the two sets of image data to produce a difference image 140. Because most of the data points in the two sets of image data are the same, most of the corresponding data points will cancel each other out, with the one exception being the data points that correspond to the retroreflector. Therefore, the difference between the on-axis image data and off-axis image data gives a definitive indication of the retroreflector's position. As depicted in FIG. 5, the difference image definitively identifies the retroreflector while excluding any of the other objects. Referring back to FIG. 1, the difference operation is carried out by the processor 106.

Because a difference function is relied upon to generate position information, it is important to generate two sets of image data that can be efficiently compared. In one embodiment, light detected by the imager is filtered to limit the detected light to wavelength bands around the wavelengths used for illumination. For example, when light of wavelengths λ1 and λ2 is used for illumination, a bulk filter with transmission peaks at wavelengths λ1 and λ2 can be located in front of the imager to filter out light of other wavelengths (e.g., ambient light).

Figure 19A:
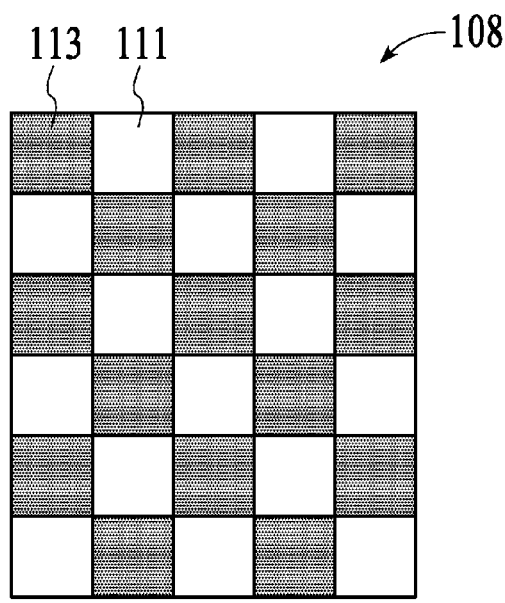
FIG. 19A depicts a top view of an imager that includes a checkerboard filter pattern.
Figure 19B:
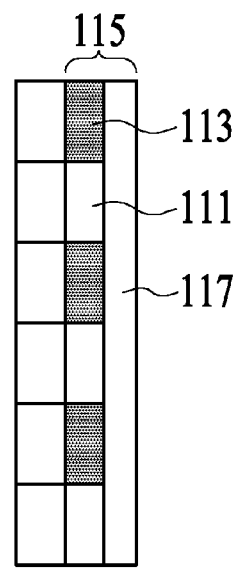
FIG. 19B depicts a side view of the imager from FIG. 19A with a hybrid filter over the imager.

The imager can be configured to distinguish light of the two wavelengths used for illumination. This can be done, for example, by locating a checkerboard filter pattern in front of the imager. An example of a hybrid filter for an imager that includes a bulk filter with two peaks and a checkerboard filter pattern is described in U.S. patent applications both entitled "Method and system for wavelength-dependent imaging and detection using a hybrid filter," application Ser. No. 10/739,831, filed on Dec. 18, 2003 and application Ser. No. 10/843,517, filed on May 10, 2004, both of which are assigned to the assignee of the current invention and incorporated by reference herein. FIG. 19A depicts a top view of imager 108 that includes a checkerboard filter pattern. In the embodiment of FIG. 19A, some imager pixels are covered by filters 111 (represented by the light squares) that pass light at wavelength λ1 and the other imager pixels are covered by filters 113 (represented by the dark squares) that pass light at wavelength λ2. FIG. 19B depicts a side view of the imager from FIG. 19A with a hybrid filter 115 located in front of the imager. The hybrid filter includes a bulk filter 117 and the wavelength-selective filters 111, 113. In another embodiment, only one set of squares (e.g., either the light or dark squares) includes a wavelength-selective filter. Using a hybrid filter, the imager can simultaneously generate the two sets of image data while the retroreflector is illuminated by reflected light from both light sources.

Alternatively, the two sets of image data can be collected sequentially. For example, the imager and light sources can be coordinated so a first set of image data is collected while only the first light source is activated and the second set of image data is collected while only the second light source is activated. The sequential activation of light sources and collection of the image data can be controlled by the processor. Although one example of sequentially collecting the two sets of image data is described, other sequential collection techniques are possible.

Figure 6:
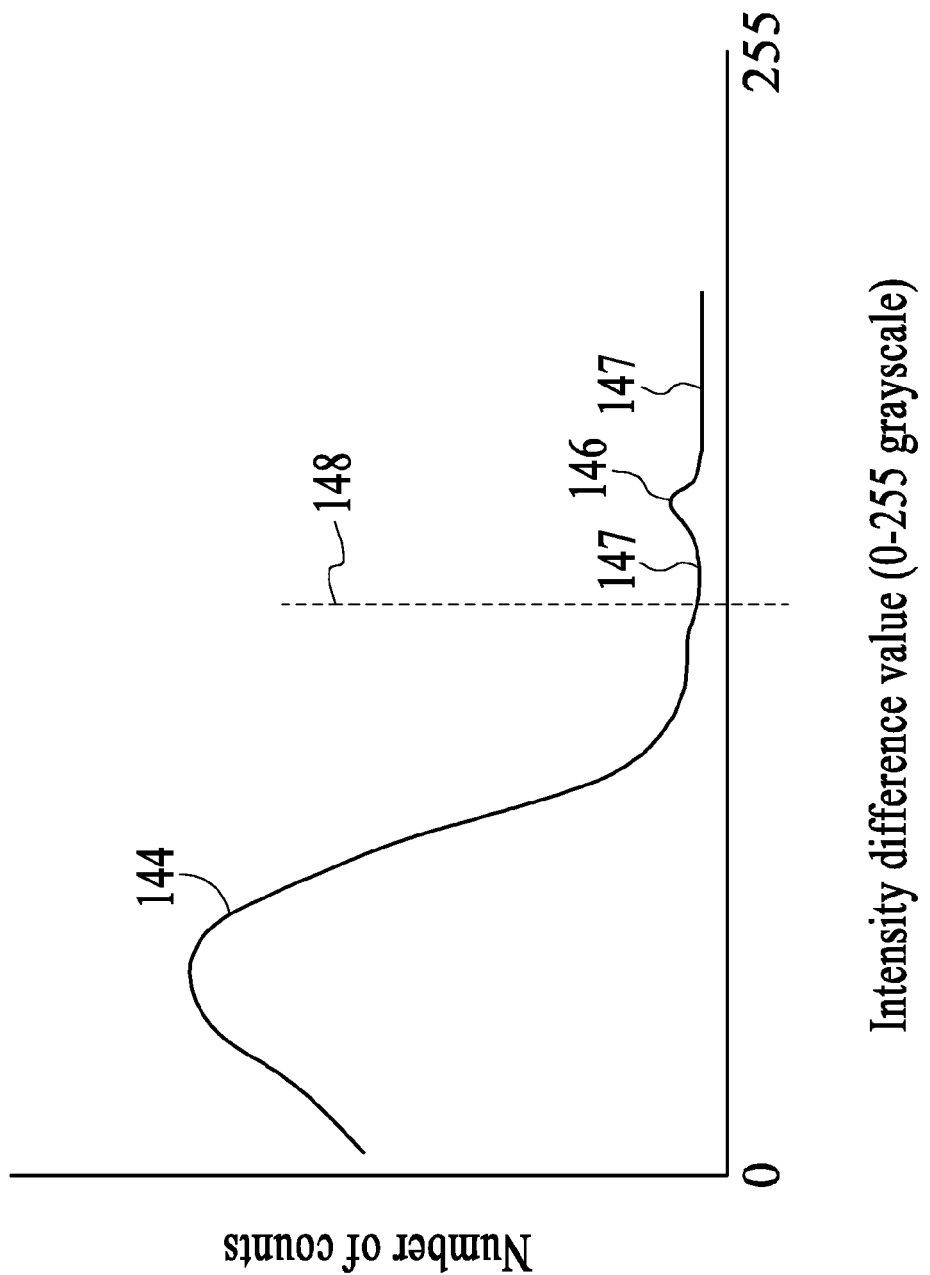
FIG. 6 is an exemplary graph of difference image data with the intensity difference values on the x-axis and the number of data points collected at each intensity difference value on the y-axis.

Although the two sets of image data essentially cancel each other out in all areas except at the retroreflector, there are usually small differences in light intensity at the non-retroreflector data points. These intensity differences are insignificant in comparison to the intensity differences at the data points that correspond to the retroreflector. In an embodiment, difference processing includes utilizing a threshold function to eliminate insignificant data points. FIG. 6 is an exemplary graph of difference image data with the intensity difference values on the x-axis and the number of data points collected at each intensity difference value on the y-axis. Note that the data points can be corrected to deal with negative intensity difference values. As represented by the peak 144 in the graph, most of the data points are clustered together. These data points represent the areas where the two sets of image data are roughly equivalent and essentially, but not completely, cancel each other out. There is another smaller cluster of data points 146 located where the intensity difference values are greater. This smaller cluster of data points corresponds to the light that is reflected from the retroreflector. As described above, the intensity difference values at these data points are larger because of the on-axis versus off-axis effect.

In order to easily separate the insignificant intensity difference values (i.e., the difference values that do not correspond to the retroreflector) from the significant intensity difference values (i.e., the difference values that do correspond to the retroreflector), a threshold difference value is established below which intensity difference values are considered insignificant and above which intensity difference values are considered significant. As represented by the dashed line 148 in FIG. 6, the threshold difference value is established at an intensity between the two clusters of data points 144, 146. In an embodiment, the threshold difference value is pre-established or set from characteristics of current or prior frames and is used to simplify the difference processing. In particular, the processor can be configured to discard all intensity difference values that are below the threshold difference value. Some artifacts 147 may remain after all the intensity difference values below the threshold difference value are discarded. Discarding insignificant data points reduces the memory requirements of the processor and enables faster processing and less latency. In one embodiment, the image processing time is reduced by processing only portions of an image that are near to where the retroreflector was previously found.

Intensity difference values that are determined to be significant are processed to identify the retroreflector. For example, all of the significant intensity difference values are processed to identify the center of the retroreflector. The location of the retroreflector's center can then be forwarded to a computer system through, for example, a universal serial bus (USB) interface. The processor may perform additional processing including, for example, confirming that the features of the retroreflector in the difference image match the known retroreflector characteristics and confirming that a pattern of potential retroreflector positions in the difference image conforms to a known pattern of positions. For example, the difference image may be compared to known image information to determine if features in the difference image match features of the retroreflector or retroreflectors.

Figure 7:
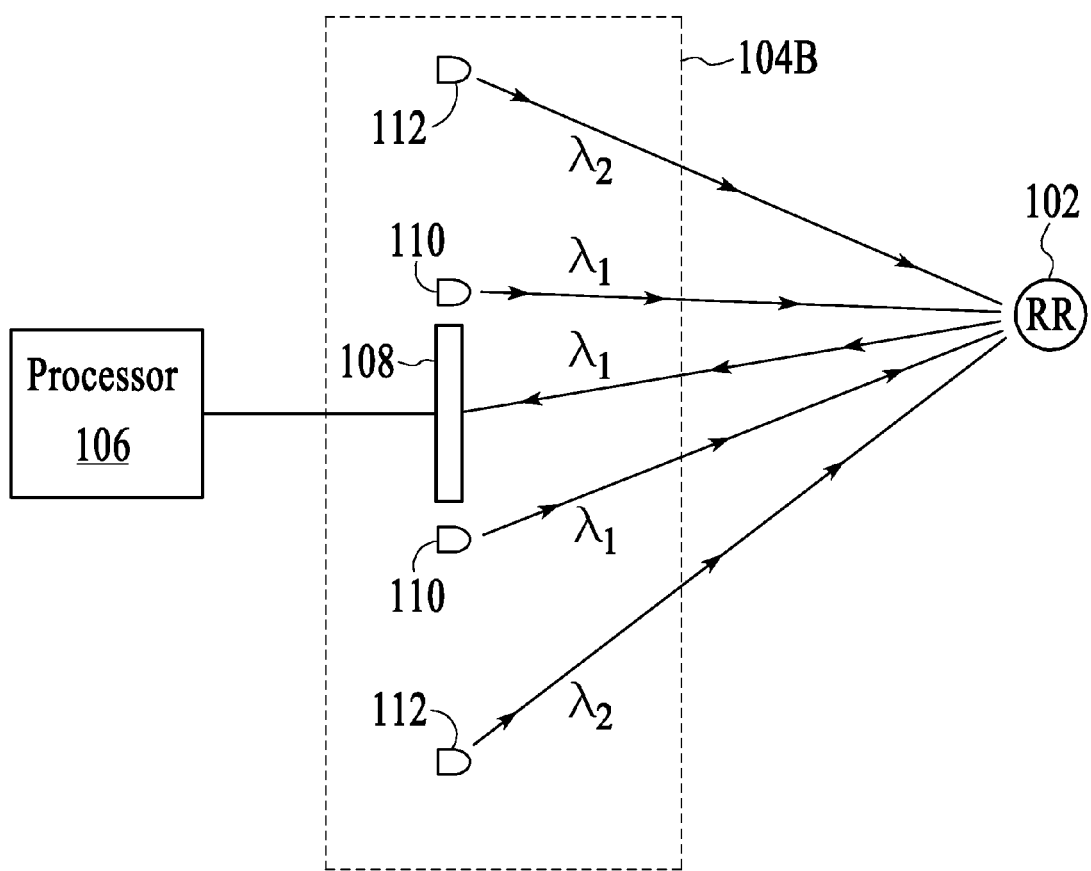
FIG. 7 depicts an alternative embodiment of the image collection system from FIG. 1 that includes one imager and multiple on-axis and off-axis light sources.

Characteristics of the lighting can be established to provide good image data. FIG. 7 depicts an alternative embodiment of the image collection system 104A from FIG. 1 in which the image collection system 104B includes one imager 108, multiple on-axis light sources 110, and multiple off-axis light sources 112. In this embodiment, light sources 110 generate light at wavelength $\lambda 1$ and are located closer to the imager than light sources 112, which generate light at wavelength $\lambda 2$. The multiple light sources are used to improve the field of illumination of the image collection system over the system of FIG. 1. The on-axis and off-axis image data are collected and processed as described above with reference to FIG. 1. Although two examples of light source configurations are described with reference to FIGS. 1 and 7, other configurations can be used.

Although one exemplary image collection system 104A is described with reference to FIG. 1, many alternative embodiments of the image collection system are possible. All embodiments of the image collection system collect at least two sets of image data, where one set of image data includes a stronger indication of the retroreflector 102 than the other set of image data. As shown below, two sets of image data can be collected in many different ways.

Figure 8:
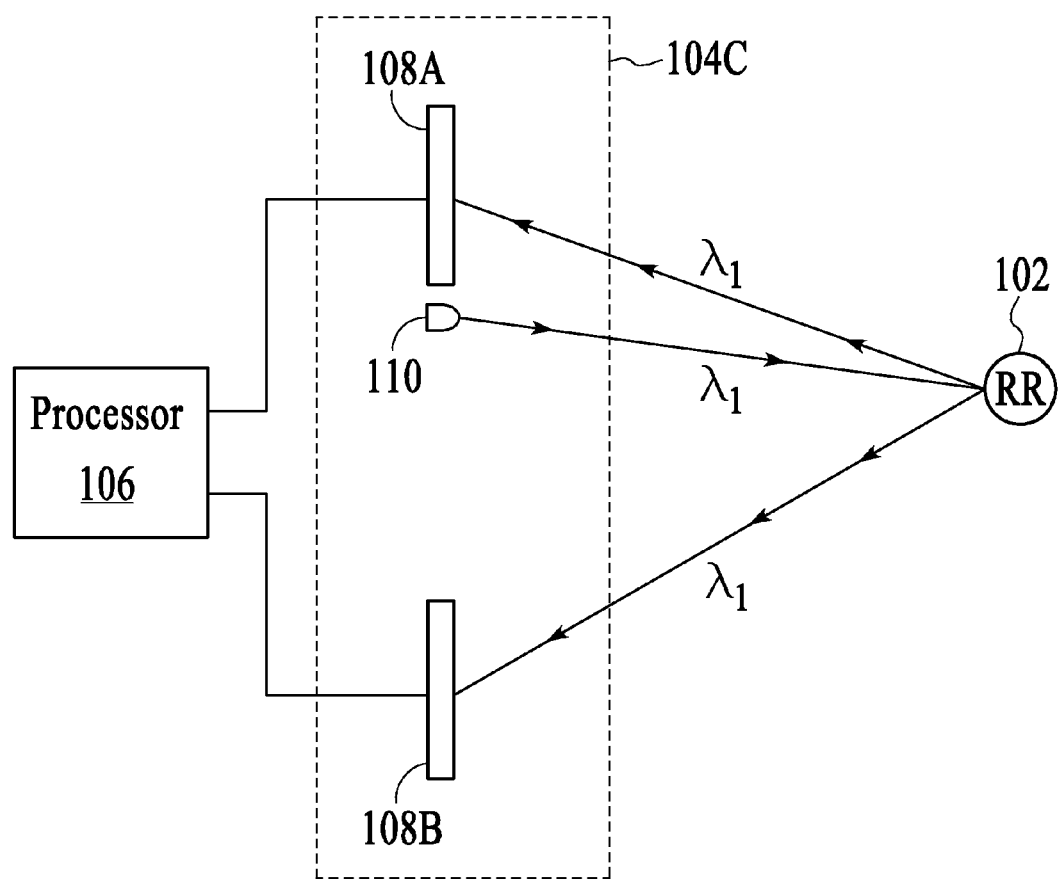
FIG. 8 depicts an embodiment of an image collection system that includes two imagers and a single light source.

FIG. 8 depicts an embodiment of an image collection system 104C that includes two imagers 108A, 108B and a single light source 110. The single light source provides light at wavelength $\lambda 1$ and is located closer to imager 108A than to imager 108B such that the difference between the illumination angle and the detection angel at imager 108A is smaller than the difference between the illumination angle and the detection angle at imager 108B. Because of the location of the light source relative to the two imagers, on-axis image data is collected at imager 108A and off-axis image data is collected at imager 108B. Once the on-axis and off-axis image data is collected, it is processed as described above to generate position information.

Figure 9:
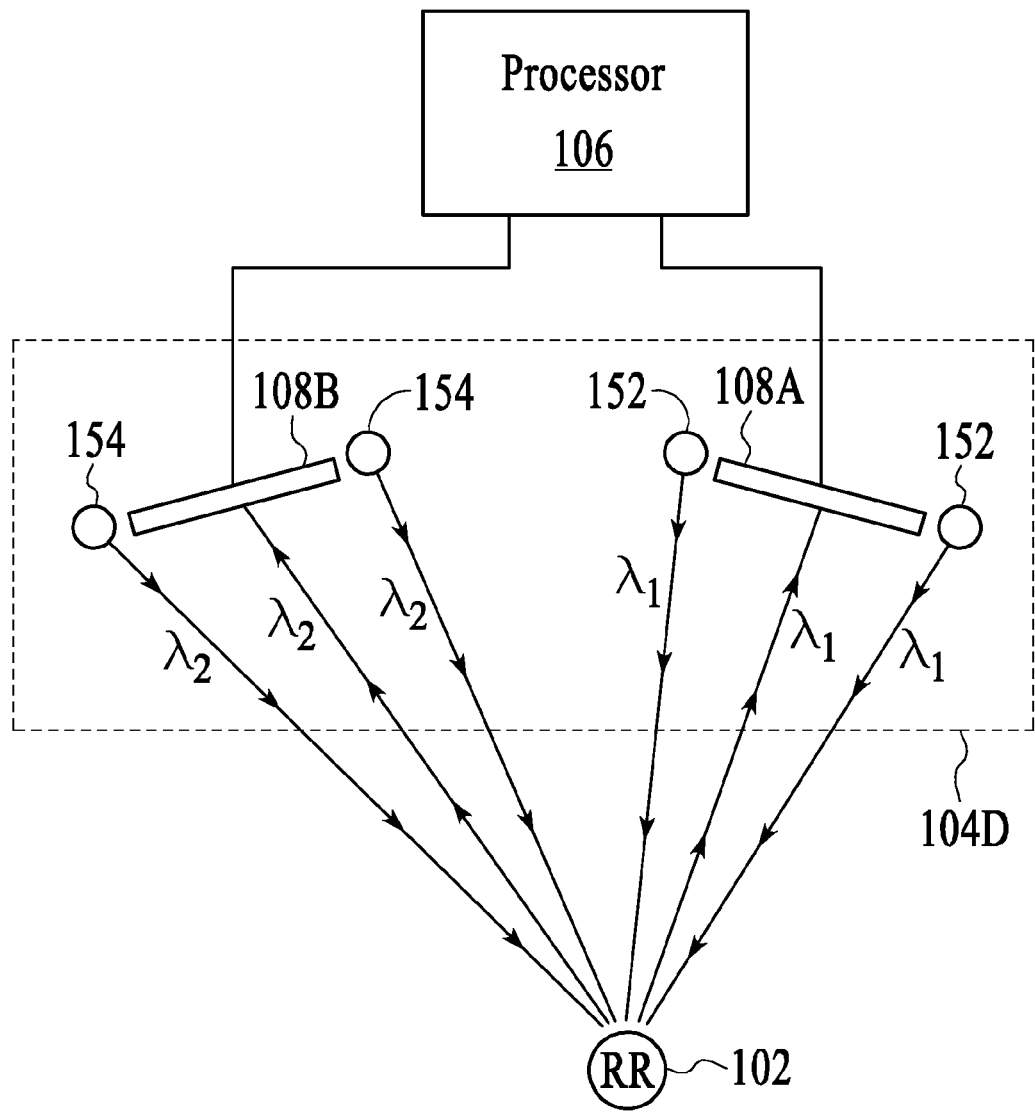
FIG. 9 depicts an embodiment of the image collection system that includes two imagers and light sources that provide light of two different wavelengths.
Figure 10:
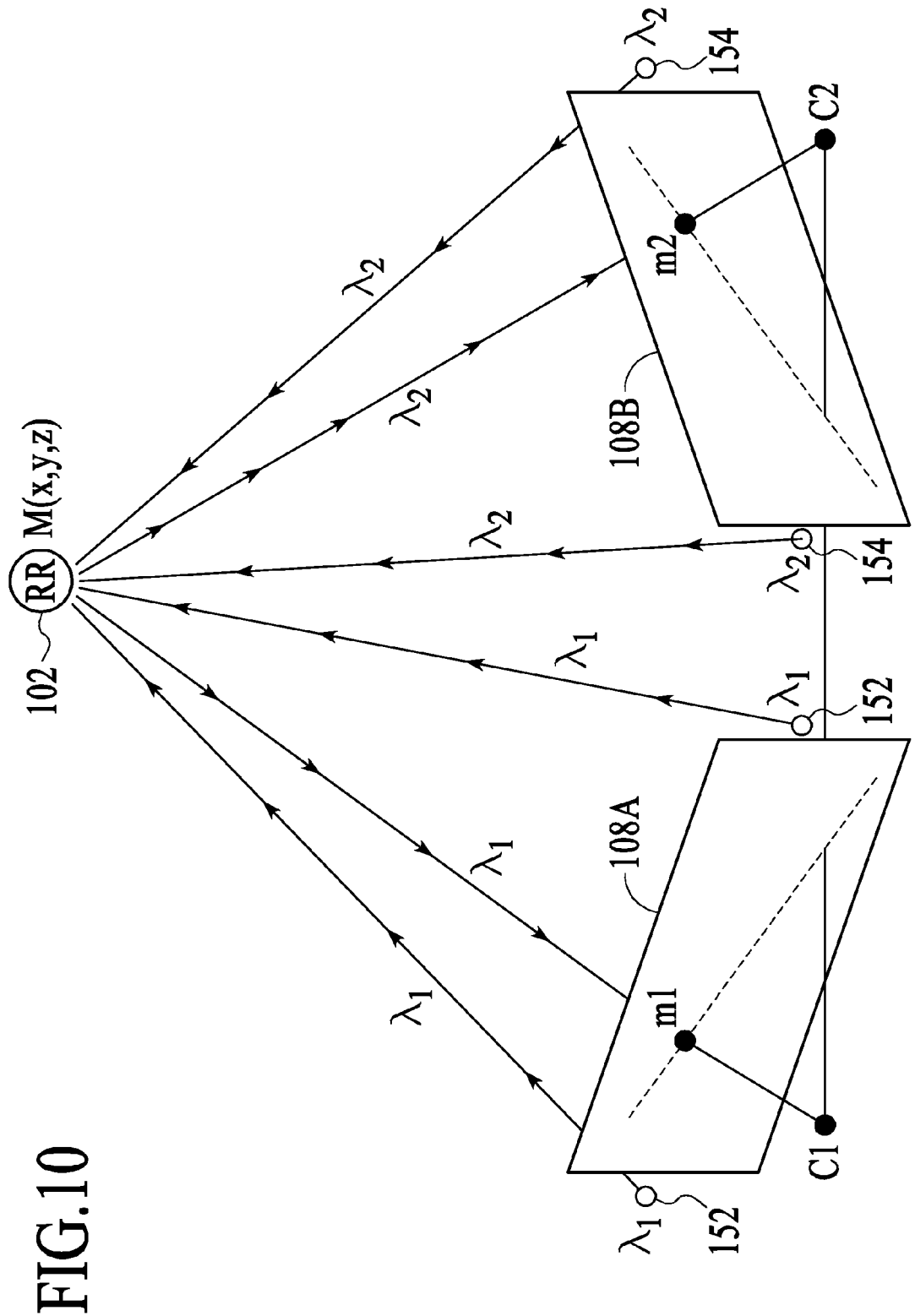
FIG. 10 is a perspective view of the image collection system of FIG. 9 configured in an epipolar geometry.

FIG. 9 depicts an alternative embodiment of the image collection system 104D that includes two imagers 108A, 108B and light sources 152, 154 that provide light of two different wavelengths. In particular, two light sources 152 that generate light at wavelength $\lambda 1$ are located nearer to imager 108A than to imager 108B and two light sources 154 that generate light at wavelength $\lambda 2$ are located nearer to imager 108B than to imager 108A. With respect to light of wavelength $\lambda 1$, on-axis image data is collected at imager 108A and off-axis image data is collected at imager 108B. With respect to light of wavelength $\lambda 2$, on-axis image data is collected at imager 108B and off-axis image data is collected at imager 108A. The configuration of FIG. 9 enables two different sets of on-axis image data and two different sets of off-axis image data to be collected. The two imagers and the two different sets of on-axis image data and off-axis image data can be used to generate position information in three dimensions using stereo processing or simplified stereo processing techniques. In an embodiment, the image collection system is configured in an epipolar geometry relative to the retroreflector. FIG. 10 is a perspective view of the image collection system 104D of FIG. 9 configured in an epipolar geometry. Given the epipolar geometry, the x, y, and z coordinates of the retroreflector 102 at position M can be calculated by first determining the positions m1 and m2 of the retroreflector 102 on the imagers 108A, 108B.

Figure 11:
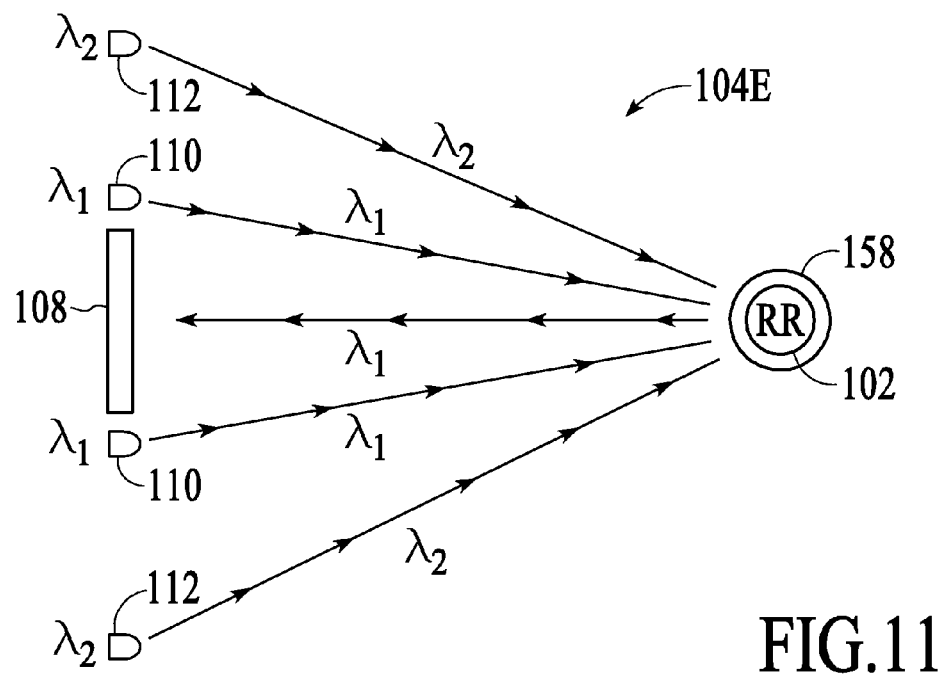
FIG. 11 depicts an embodiment of an image collection system that includes on-axis and off-axis light sources and a wavelength-selective filter formed over the retroreflector.

In another alternative embodiment, the image collection system includes a wavelength-selective filter associated with the retroreflector. For example, the filter may cover the retroreflector. FIG. 11 depicts an embodiment of an image collection system 104E that includes on-axis and off-axis light sources 110, 112 and a wavelength-selective filter 158 covering the retroreflector. In the embodiment of FIG. 11, the wavelength-selective filter is transmissive at wavelength $\lambda 1$ and blocking at wavelength $\lambda 2$. By transmitting light at wavelength $\lambda 1$ and blocking light at wavelength $\lambda 2$, the wavelength-selective filter provides a higher intensity contrast at the data points corresponding to the retroreflector.

Figure 12:
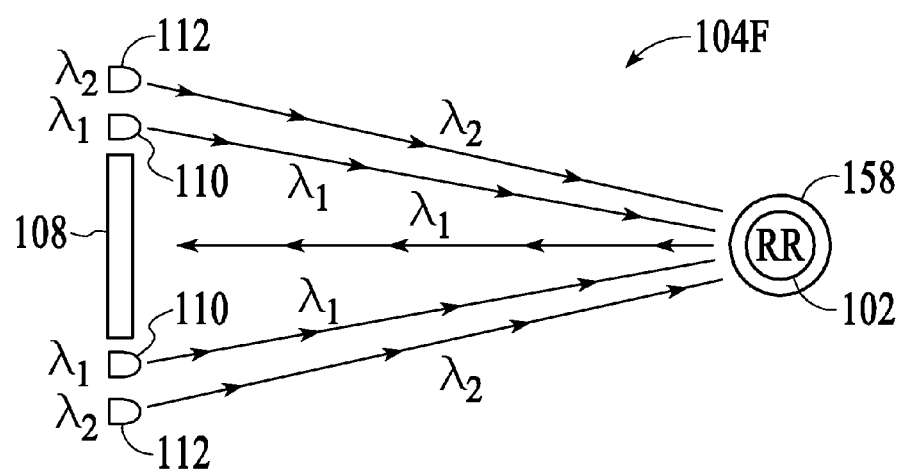
FIG. 12 depicts an exemplary embodiment of an image collection system in which the light sources of two different wavelengths have the same, or roughly the same, illumination angle and in which a wavelength-selective filter is formed over the retroreflector.

Because a wavelength-selective filter associated with the retroreflector can filter one of the wavelengths of light emitted by the light sources, the two sets of image data can be generated with the light sources at the same illumination angle. FIG. 12 depicts an exemplary embodiment of an image collection system 104F in which the light sources 110, 112 of two different wavelengths have similar illumination angles. In the example of FIG. 12, the wavelength-specific filter 158 associated with the retroreflector 102 is highly transmissive at wavelength $\lambda 1$ and blocking at wavelength $\lambda 2$. A first set of image data is collected in response to reflected light at wavelength $\lambda 1$ and a second set of image data is collected in response to reflected light at wavelength $\lambda 2$. Because the wavelength-selective filter associated with the retroreflector is highly transmissive at wavelength $\lambda 1$ and blocking at wavelength $\lambda 2$, the first set of image data includes a stronger indication of the retroreflector than the second set of image data. The two sets of image data are processed as described above to generate position information.

Figure 13:
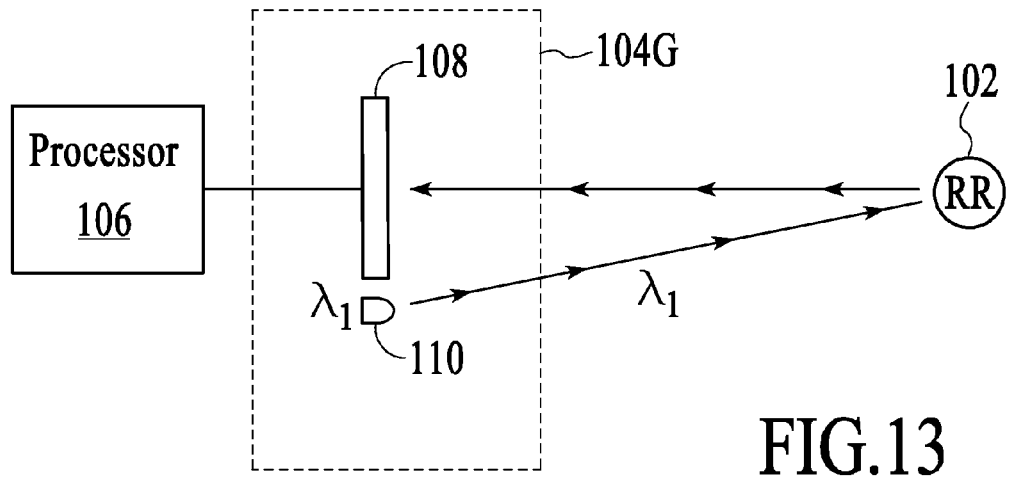
FIG. 13 depicts an embodiment of an image collection system that includes one imager and a single light source.

In another alternative embodiment, the image collection system includes one imager and one light source. FIG. 13 depicts an embodiment of an image collection system 104G that includes one imager 108 and one on-axis light source 110. The light source generates light at wavelength, $\lambda 1$, and the imager is configured with a checkerboard filter, as described above, in which half of the checkerboard squares pass light at wavelength $\lambda 1$ and half of the squares block light at wavelength $\lambda 1$. Given this configuration, a first set of image data is generated in response to light at wavelength $\lambda 1$ and a second set of image data is generated in response to ambient light minus light at wavelength $\lambda 1$. Because the light source is on-axis, the first set of image data includes a stronger indication of the retroreflector than the second set of image data. In an embodiment, a wavelength-selective filter is located between the retroreflector and the imager. The wavelength-selective filter passes light at wavelength λ1 and blocks light at other wavelengths. As described above with reference to FIGS. 11 and 12, the wavelength-selective filter provides a higher intensity contrast at the data points corresponding to the retroreflector.

Figure 14:
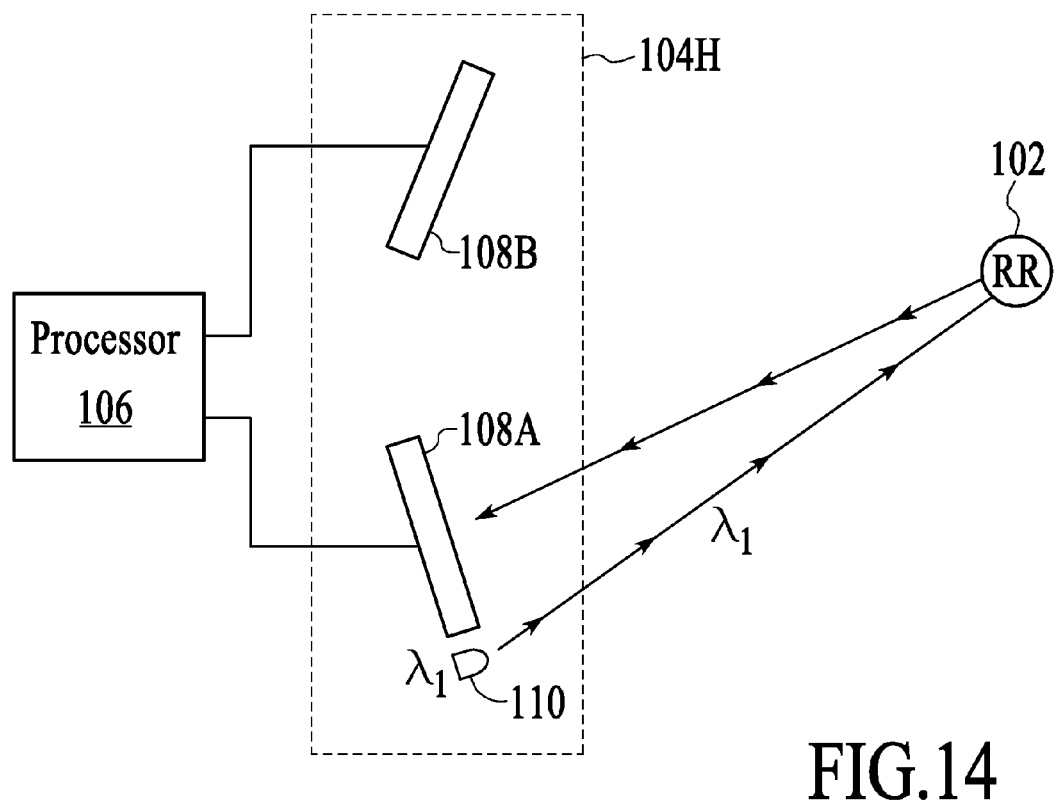
FIG. 14 depicts another embodiment of a single light source image collection system.

FIG. 14 depicts another embodiment of a single light source image collection system. The image collection system of FIG. 14 utilizes two separate imagers 108A and 108B to collect the two sets of image data. In particular, on-axis image data is collected at imager 108A and off-axis image data is collected at imager 108B. Again, a wavelength-selective filter can be located between the retroreflector and the imager to pass light at wavelength λ1.

Figure 15:
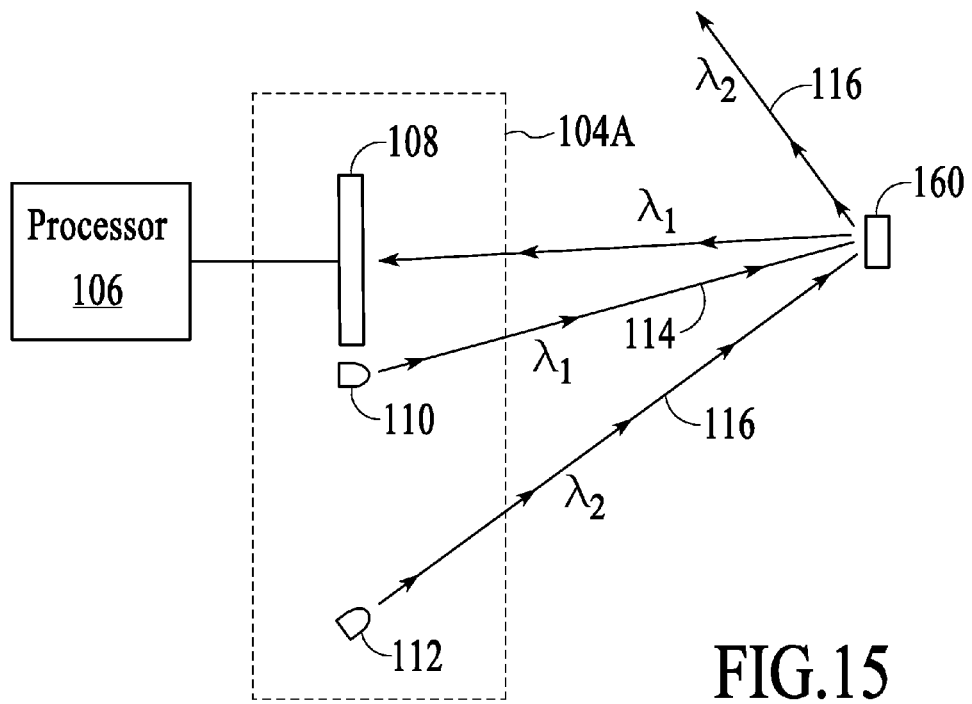
FIG. 15 depicts an embodiment of a system for generating position information that utilizes a reflector other than a retroreflector.

Although the reflective element is described above as a retroreflector, a reflector other than a retroreflector can be used instead of the retroreflector. FIG. 15 depicts an embodiment of a system for generating position information that utilizes a mirror 160 instead of a retroreflector. As illustrated in FIG. 15, the off-axis light 116 is reflected by the mirror at an angle of reflection equal to the angle of incidence. Reflecting the off-axis light at this angle of reflection causes the reflected off-axis light to miss the imager 108. On the other hand, the mirror reflects on-axis light 114 back towards the imager, thus enabling the generation of two sets of image data, where one set of image data includes a stronger indication of the reflector than the other set of image data. In this configuration, the mirror is oriented such that it reflects one of the two light beams back to the imager. Alternatively, the system can be configured such that the mirror reflects light from light source 112 back towards the imager instead of light from light source 110.

A retroreflector can be used in a pointing application, for example, as a mouse in a GUI-based computer. In an embodiment, the retroreflector constitutes part of a pointing device that can be held and or moved by a user. When used in a pointing application, it is desirable to have the ability to emulate certain commands via the pointing device. For example, it is desirable to be able to convey conventional mouse functions such as "clicking," "dragging," "scrolling," and lift detection.

Some conventional mouse functions can be emulated by configuring the pointing device and the retroreflector such that the retroreflector can be shielded or revealed in response to an action by the user. In one embodiment, the retroreflector is shielded or revealed by a mechanism that is activated by the user.

Figure 16A:
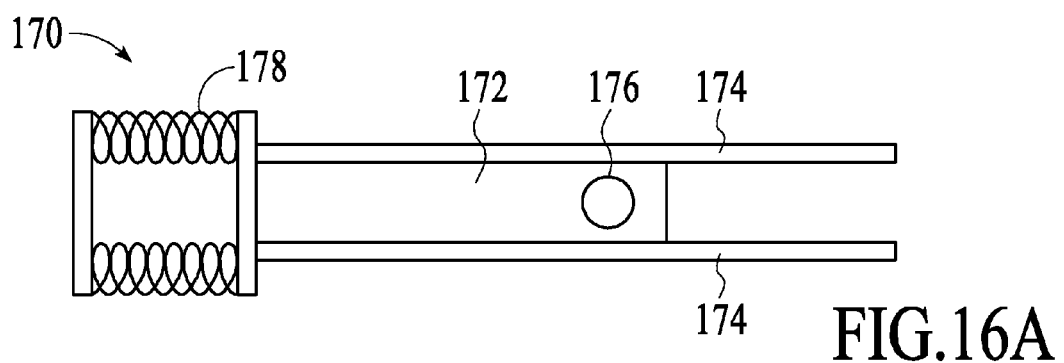
FIGS. 16A and 16B depict an embodiment of a pointing device that incorporates a mechanism for shielding and revealing a retroreflector.
Figure 16B:
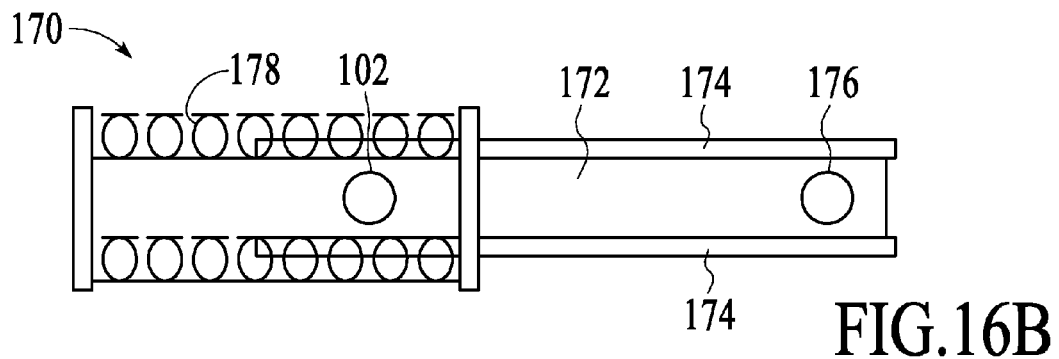

FIGS. 16A and 16B depict an embodiment of a pointing device 170 that incorporates a mechanism for shielding or revealing a retroreflector. The pointing device includes a retroreflector 102 (FIG. 16B), a cover 172, guides 174, a finger recess 176, and a return spring 178. In FIG. 16A the retroreflector (not shown) is shielded by the cover. The user can reveal the retroreflector by moving the cover with the movement of a finger engaged with the finger recess 176. FIG. 16B shows the cover after it has been moved to reveal the retroreflector.

Figure 17A:
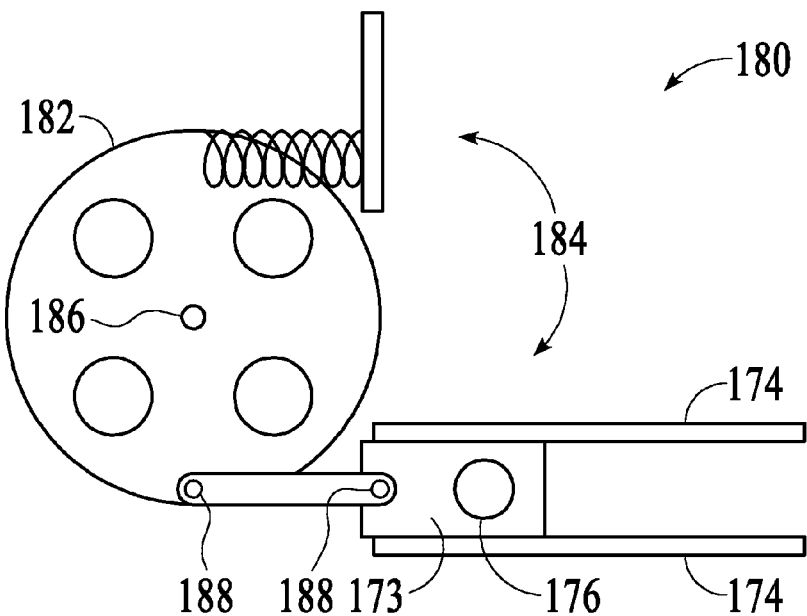
FIGS. 17A and 17B depict another embodiment of a pointing device that incorporates a mechanism for shielding and revealing multiple retroreflectors.
Figure 17B:
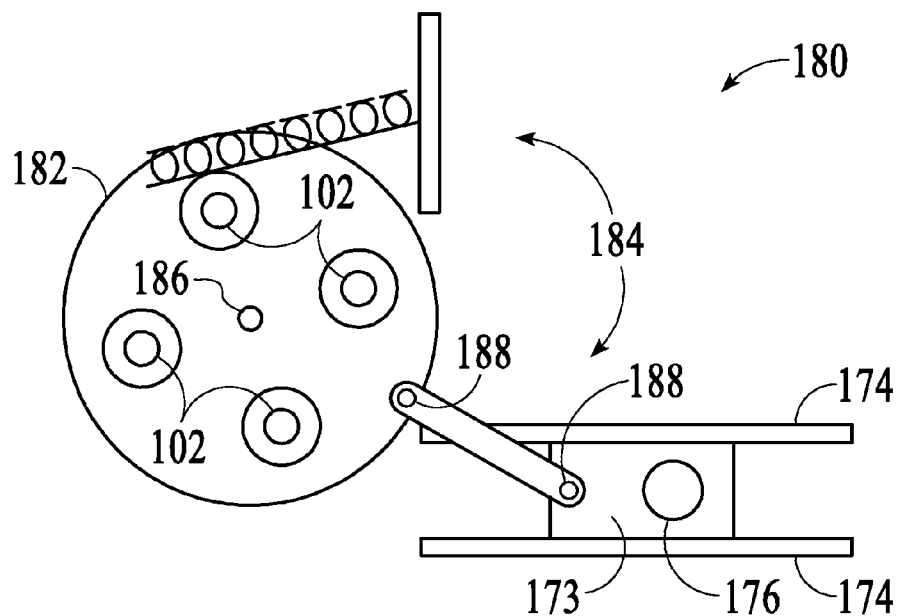

FIGS. 17A and 17B depict an embodiment of a pointing device 180 that incorporates a mechanism for shielding and revealing multiple retroreflectors. The pointing device includes a cover 182, multiple retroreflectors 102, and a linear-to-rotation conversion mechanism 184. The linear-to-rotation conversion mechanism includes an axle 186, pivoting joints 188, a slider 173, guides 174, and a finger recess 176. In FIG. 17A the retroreflectors are shielded by the cover. A user can reveal the retroreflectors using the linear-to-rotation conversion mechanism to rotate the cover. In FIG. 17B the cover has been rotated using the linear-to-rotation conversion mechanism to reveal the retroreflectors through holes in the cover.

Figure 18A:
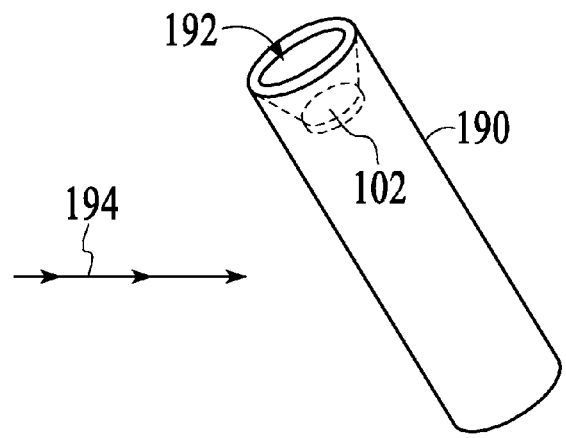
FIGS. 18A and 18B depict an embodiment of a pointing device that includes a retroreflector embedded into a cavity of a pointing device.
Figure 18B:
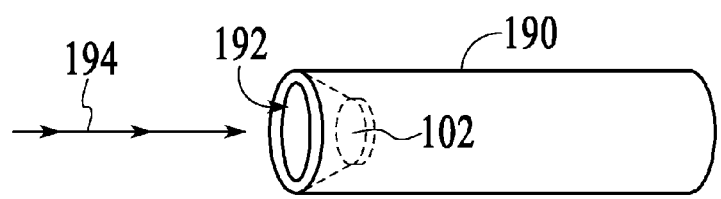

In another embodiment, the retroreflector is shielded or revealed by a combination of the structure and orientation of the pointing device. For example, at least one retroreflector is located at the bottom of a cavity defined in the pointing device such that the retroreflector is shielded from illuminating light by the cavity walls when the pointing device is at some orientations with reference to the illuminating light and is exposed to the illuminating light when the pointing device is at other orientations. FIGS. 18A and 18B depict an embodiment of a pointing device 190 that includes a retroreflector 102 located at the bottom of a cavity 192 of the pointing device. When the cavity is not aimed towards the illumination light, the retroreflector is shielded by the wall of the cavity and is not illuminated. When the cavity is aimed towards the illuminating light, the retroreflector is illuminated. FIG. 18A depicts the pointing device oriented such that the illuminating light 194 is not incident on the retroreflector and FIG. 18B depicts the pointing device oriented such that the illuminating light is incident on the retroreflector.

Although some examples of techniques for shielding and revealing a retroreflector are described with reference to FIGS. 16A-18B, many other configurations are possible. In another alternative embodiment, some conventional mouse functionality can be achieved by changing some characteristic of the retroreflector or retroreflectors to emulate a mouse function. For example, the shape, size, and/or pattern of a retroreflector or retroreflectors can be changed to emulate a mouse function. In another alternative embodiment, some functionality can be achieved by gradually revealing or shielding a retroreflector. For example, the scrolling speed can be increased as more of a retroreflector is revealed or decreased as more of the retroreflector is shielded.

Figure 20:
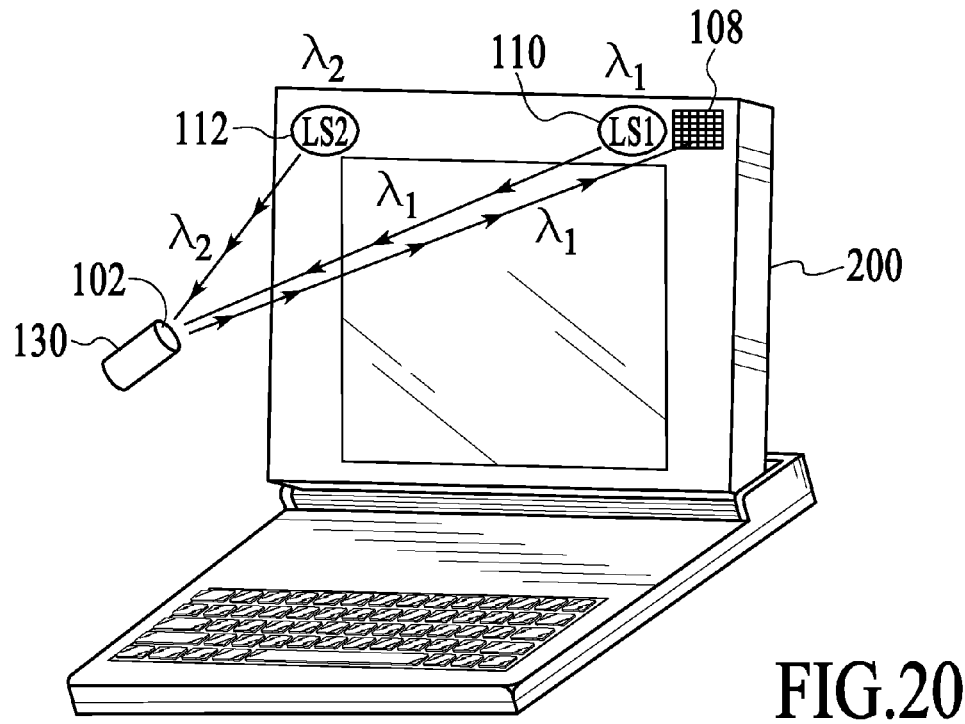
FIG. 20 depicts a portable computer configured with an image collection system that includes two light sources and one imager embedded into the housing of the computer.

The above-described techniques for generating position information can be incorporated into a position tracking system for a GUI-based computer. FIGS. 20-23 depict examples of an image collection system and a pointing device integrated with a computer system. FIG. 20 depicts a portable or "laptop" computer 200 configured with an image collection system that includes two light sources 110, 112 and an imager 108 mounted in the housing of the computer. The first light source 110 is an on-axis light source that generates light at wavelength λ1 and the second light source 112 is an off-axis light source that generates light at wavelength λ2. The configuration of the image collection system is similar to that of FIG. 1 with the processor 106 being included within the computer. A pointing device 130 that includes a retroreflector 102 is used to indicate position in a GUI-based operating system. Position of the pointing device is determined as described above.

Figure 21:
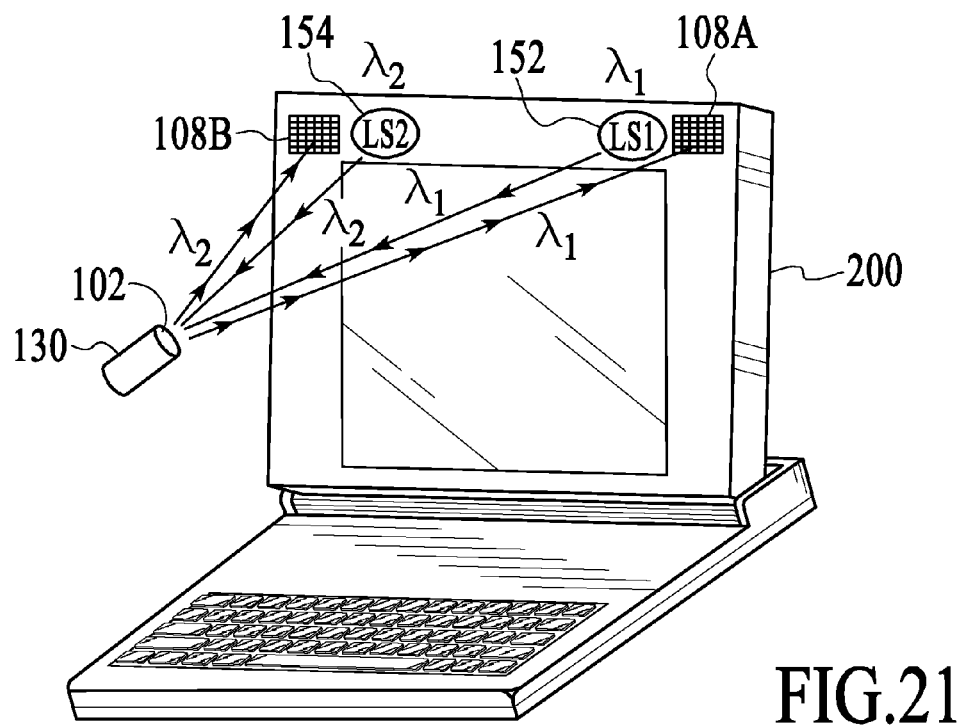
FIG. 21 depicts a portable computer configured with an image collection system that includes two light sources and two imagers embedded into the housing of the computer.

FIG. 21 depicts a portable computer 200 configured with an image collection system that includes two light sources 152, 154 and two imagers 108A, 108B mounted in the housing of the computer. The configuration of the image collection system is similar to that of FIG. 9. Given this configuration, stereo processing can be used to determine the three-dimensional position of the pointing device.

Figure 22A:
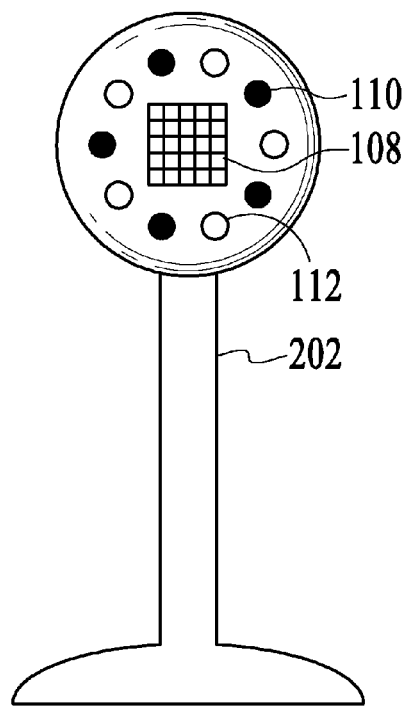
FIG. 22A a front view of an image collection system in which an imager and light sources are incorporated into a free standing housing.
Figure 22B:
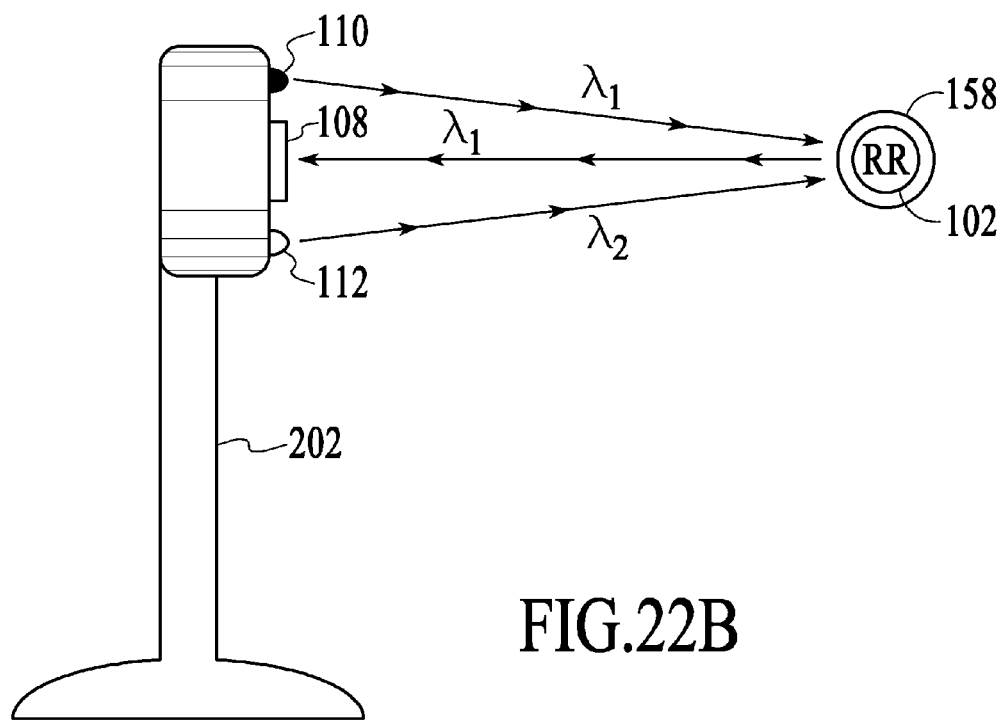
FIG. 22B depicts a side view of the image collection system of FIG. 22A.

FIGS. 22A and 22B depict front and side views of an embodiment of an image collection system in which an imager 108 and light sources 110 and 112 are incorporated into a free standing housing 202. Referring to FIG. 22A, light sources 110 emit light at wavelength λ1 and light sources 112 emit light at wavelength λ2. Referring to FIG. 22B, the retroreflector is covered with a wavelength-selective filter that is transmissive at wavelength λ1 and blocking at wavelength λ2. The operation of this configuration is similar to the configuration described above with reference to FIG. 12. Specifically, a first set of image data is collected in response to reflected light at wavelength λ1 and a second set of image data is collected in response to reflected light at wavelength λ2. Because the wavelength-selective filter associated with the retroreflector is transmissive at wavelength λ1 and blocking at wavelength λ2, the first set of image data includes a stronger indication of the retroreflector than the second set of image data. The two sets of image data are processed as described above to generate position information. The image collection system depicted in FIGS. 22A and 22B can be used in conjunction with a computer. For example, the image collection system can be connected to a computer through a wired USB connection or a wireless connection. In an embodiment, the head 203 of the housing can be rotated to change the field of view of the light sources and imager. For example, the head can be rotated downward to, for example, bring a desktop that is used for mouse navigation into view.

Figure 23:
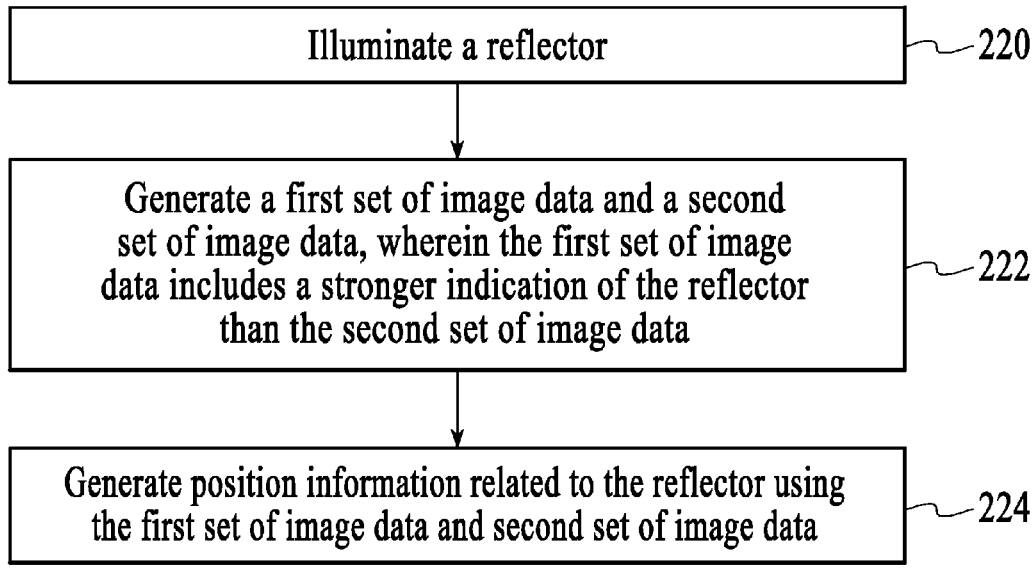
FIG. 23 depicts a process flow diagram of a method for generating position information.

FIG. 23 depicts a process flow diagram of a method for generating position information. At block 220, a reflector is illuminated. At block 222, a first set of image data and a second set of image data are generated. The first set of image data includes a stronger indication of the reflector than the second set of image data. At block 224, position information related to the reflector is generated using the first set of image data and the second set of image data.

Figure 24:
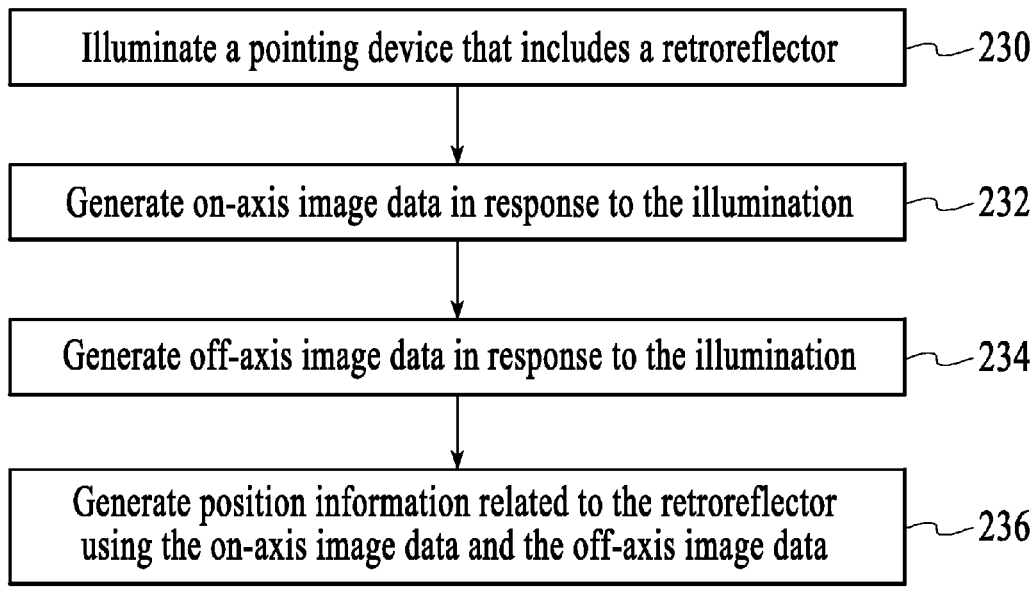
FIG. 24 depicts a process flow diagram of another method for generating position information.

FIG. 24 depicts a process flow diagram of another method for generating position information. At block 230, a pointing device that includes a retroreflector is illuminated. At block 232, on-axis image data is generated in response to the illumination. At block 234, off-axis image data is generated in response to the illumination. At block 236, position information related to the retroreflector is generated using the on-axis image data and the off-axis image data.

Because the image collection system does not rely on reflections from a desktop surface as is the case in conventional optical mouse devices, the position of the pointing device can be tracked even when the pointing device sits on a non-reflective surface or a microscopically smooth surface such as glass.

Although the system for generating position information is described with reference to pointing applications for GUI-based computer operating systems, the above-described technique for generating position information can be used in other applications that involve determining the position of an object. One application includes, for example, tracking the motion of a body part for use in motion capture or game playing.

Another advantage of the above-described dual image position tracking technique is that the use of a reflector or a retroreflector allows the image data to be collected with reduced exposure time compared to conventional digital photography exposure times.

Although the retroreflectors are described as being attached to a pointing device, the retroreflectors could be integrated with some other objects. For example, the retroreflectors can be attached to clothing, to parts of the body, or any other object whose position and/or orientation is of interest.

An object in free space can be characterized in terms of six degrees of freedom, including three degrees of freedom in translation (e.g., the x, y, and z axes) and three degrees of freedom in rotation (e.g., rotation about the x, y, and z axes). The position of an object can be characterized in terms of, for example, the x, y, and z axes. The orientation of an object can be characterized in terms of, for example, rotation around the x, y, and z axes.

The technique described above with reference to FIGS. 1-24 focuses primarily on generating position information related to an object, for example, the two-dimensional position of an object in terms of the x and y axes or the three-dimensional position of an object in terms of the x, y, and z axes. In some applications, it is desirable to determine the orientation of an object either alone or in conjunction with the position of the object. In accordance with the invention, generating orientation information involves capturing two sets of image data using at least one reflector with an orientation-specific characteristic or a reflector integrated into a device that includes some orientation-specific structural feature. The two sets of image data are then used to generate orientation information. In particular, the difference is taken between the two sets of image data and because the image data is captured using a reflector with an orientation-specific characteristic or a reflector integrated into a device that includes an orientation-specific structural feature, the resulting difference image includes orientation-specific image information related to the orientation of the reflector.

Figure 32A:
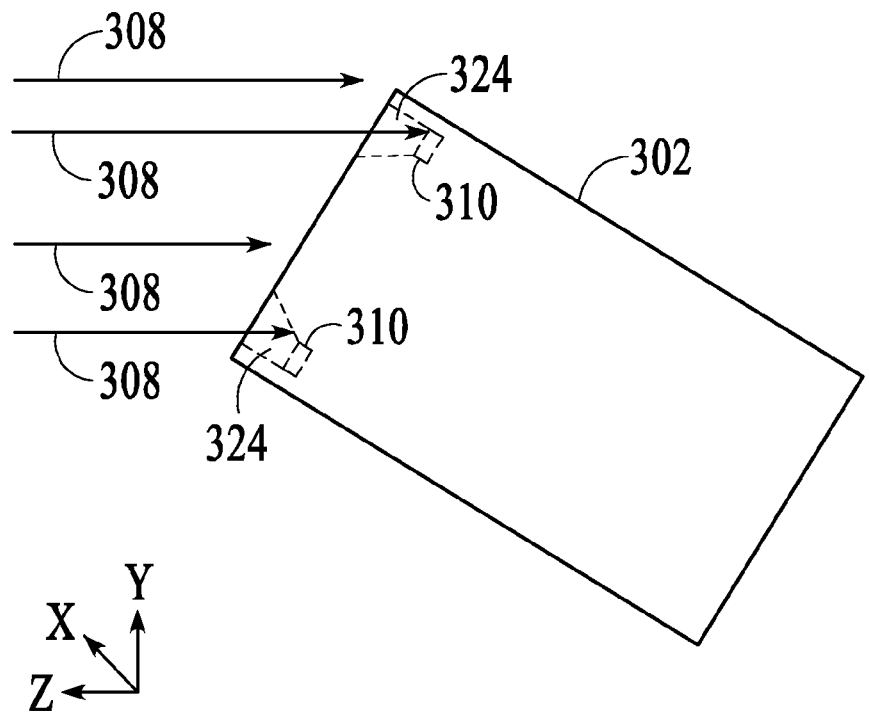
FIG. 32A depicts a side view of the pointing device from FIGS. 30A and 30B in which the cavities and retroreflectors are oriented relative to the beam of light such that only some of the retroreflectors are illuminated.
Figure 32B:
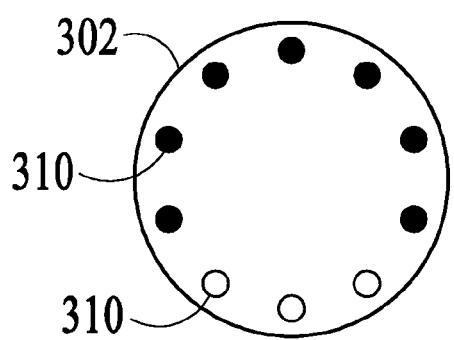
FIG. 32B is a front view of the pointing device from FIG. 32A in which the illuminated retroreflectors are represented by filled in dark circles and the non-illuminated retroreflectors are represented by the un-filled in circles.
Figure 33A:
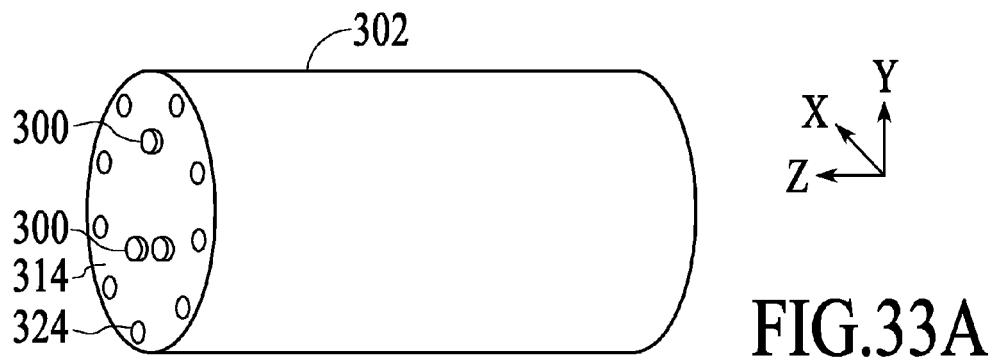
FIGS. 33A and 33B depict an example of a pointing device that utilizes an orientation-specific pattern of retroreflectors as described with reference to FIGS. 26A and 26B in conjunction with a pattern of retroreflectors that is integrated into orientation-specific features of the pointing device as described with reference to FIGS. 30A-32B.
Figure 33B:
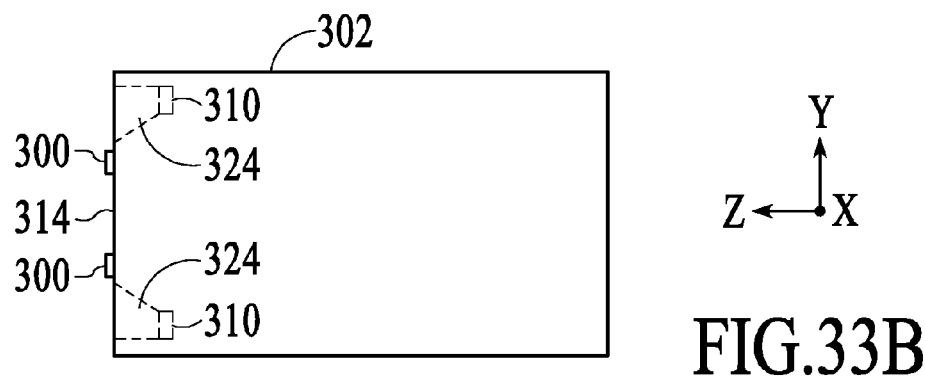

Orientation-specific image information can be generated, for example, using a retroreflector with an orientation-specific shape, using multiple retroreflectors in an orientation-specific arrangement, or by locating one or more retroreflectors at the bottom of respective cavities of a pointing device such that the retroreflectors are illuminated only in certain orientations. Various examples of techniques for generating orientation-specific image information are described below with reference to FIGS. 25A-36. In particular, FIGS. 25A-27B depict examples of a retroreflector or multiple retroreflectors that have an orientation-specific characteristic, FIGS. 28A-32B depict examples of a retroreflector or retroreflectors integrated into a pointing device that includes some orientation-specific structural feature, and FIGS. 33A and 33B depict a pointing device that includes a combination of an orientation-specific pattern of retroreflectors and a pattern of retroreflectors integrated into a pointing device that includes orientation-specific structural features.

FIGS. 25A and 25B depict an example of a retroreflector 300 that has an orientation-specific shape, in this case an arrow. Difference images formed in response to this retroreflector are unique at every orientation of the retroreflector about the z axis. That is, the retroreflector has a rotationally asymmetric shape. In FIG. 25A the arrow points straight up and in FIG. 1B the arrow is rotated approximately forty-five degrees clockwise. The image of the arrow is identified by capturing two sets of image data and taking the difference between the two sets of image data. The orientation of the retroreflector can be determined by comparing the difference image to known image information. For example, the known image information is an image of the arrow in a known orientation. The known image and the difference image can be matched to determine orientation. For example, the rotation needed to match the difference image to the known image gives an indication of the orientation of the retroreflector. In the embodiment of FIGS. 25A and 25B, the retroreflector is located on the surface of a pointing device 302.

FIGS. 26A and 26B depict an example of multiple retroreflectors having the same shape but configured in an orientation-specific arrangement on the surface of a pointing device 302. In particular, the pattern includes three retroreflectors with a single retroreflector at the top of the pattern and two retroreflectors nearby each other at the bottom of the pattern. Difference images formed in response to this pattern of retroreflectors are unique at every orientation of the arrangement about the z axis. For example, in the orientation of FIG. 26A, the single retroreflector is at the top of the pattern and the two nearby retroreflectors are at the bottom of the pattern. In the orientation of FIG. 26B, the pattern is rotated about the z axis by about ninety degrees clockwise such that the single retroreflector is at the right of the pattern and the two nearby retroreflectors are at the left of the pattern.

FIGS. 27A and 27B depict an example of multiple retroreflectors 300 that have different shapes in an orientation-specific arrangement. In the example of FIGS. 27A and 27B, the retroreflectors are in the shape of a square, a circle, a triangle, and a diamond. Difference images formed in response to this pattern of retroreflectors are unique in every orientation about the z axis because the different shapes are in different locations in every orientation.

Figure 28A:
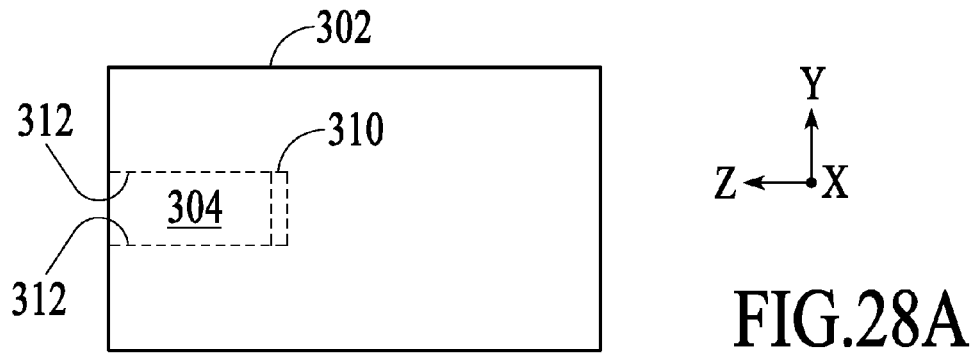
FIGS. 28A-28C depict an example of a retroreflector that is integrated into a device that has an orientation-specific structural feature.
Figure 28B:
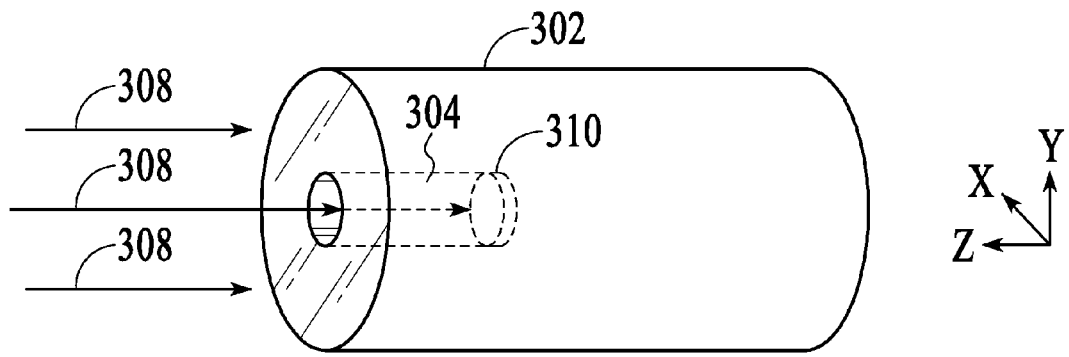
Figure 28C:
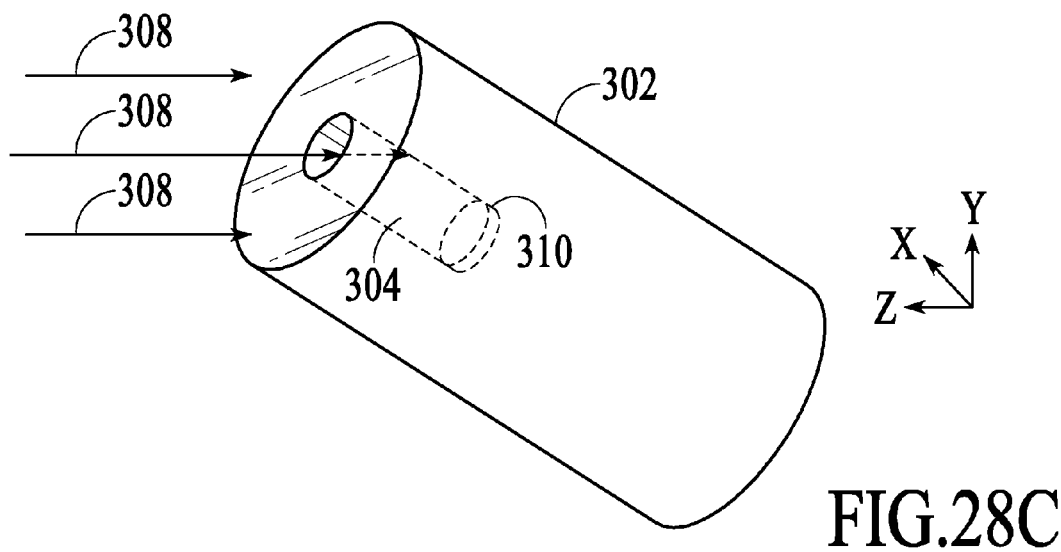

FIGS. 28A-28C depict an example of a retroreflector 310 that is integrated into a device 302 that has an orientation-specific structural feature. In the example of FIGS. 28A-28C, the device is a pointing device and the orientation-specific structural feature is a cavity 304 that extends into the pointing device from one of its surfaces. The cavity is defined by cavity walls 312 and the retroreflector 310 is located at the bottom of the cavity. FIG. 28A depicts a side view of the pointing device that identifies the cavity and the retroreflector located at the bottom of the cavity. FIG. 28B depicts a side perspective view of the pointing device, the cavity, and the retroreflector relative to a beam 308 of light. In FIG. 28B, the cavity and retroreflector are oriented relative to the beam of light such that the retroreflector is illuminated by the beam of light. Light that illuminates the retroreflector is reflected back in the same direction it is received. If the orientation of the cavity and the retroreflector relative to the beam of light changes enough, then the beam of light is blocked by some portion of the pointing device such that the retroreflector is not illuminated. In orientations other than that shown in FIG. 28B, the orientation-specific structural feature occludes the retroreflector at least in part. FIG. 28C depicts a side perspective view of the pointing device in which the cavity and the retroreflector are oriented relative to the beam of light such that the retroreflector is not illuminated. Given the configuration of FIGS. 28A-28C, a stronger indication of the retroreflector will be present in the difference image when the cavity and retroreflector are aligned with the beam of light as shown in FIG. 28B than in the difference image that is generated when the cavity and retroreflector are not aligned with the beam of light as shown in FIG. 28C. The rotational orientation of the retroreflector and the pointing device about the x and y axes can be characterized based on the existence of the retroreflector in the difference image.

In the embodiment of FIGS. 28A-28C, the alignment of the pointing device is a binary characterization. That is, the pointing device is determined to be either aligned with the beam of light when a strong indication of the retroreflector is present in the difference image or not aligned with the beam of light when a strong indication of the retroreflector is not present in the difference image. In another embodiment, the orientation between the cavity, the retroreflector, and the beam of light can be determined from the shape of the retroreflector in the difference image or from the intensity values of data points in the difference image that are related to the retroreflector. For example, in one embodiment, a partial image of the retroreflector can be used to determine orientation. In another embodiment, the intensity of the detected light from the retroreflector can be used to determine orientation. The intensity of the detected light from the retroreflector can change as the distance between the retroreflector and the imager changes and/or as orientation-specific structural features reveal or block the retroreflector as the orientation of the pointing device changes. Note that orientation can be determined from the shape of a retroreflector regardless of distance by comparing the ratio of height to width of the image.

In the example of FIGS. 28A-28C, the orientation of the pointing device 302 is determined relative to rotation around the x and y axes. As described above, the retroreflector 310 disappears from the difference image as the pointing device is tilted to the point where the retroreflector is no longer illuminated. In some applications it is desirable to simultaneously track the position and the orientation of a pointing device. The position of the pointing device in FIGS. 28A-28C cannot be tracked using the above-described dual image technique when the retroreflector is not illuminated.

Figure 29A:
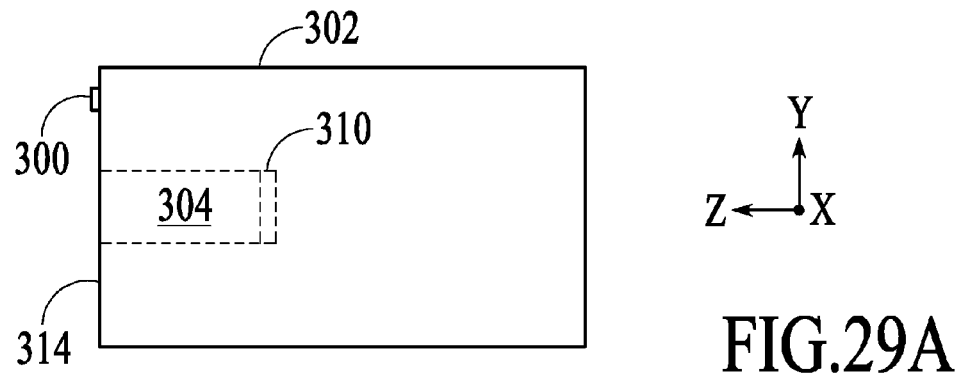
FIGS. 29A-29C depict an embodiment of a pointing device that is similar to the pointing device described with reference to FIGS. 28A-28C except that it includes a retroreflector that is not subject to the orientation-specific structural feature of the pointing device.
Figure 29B:
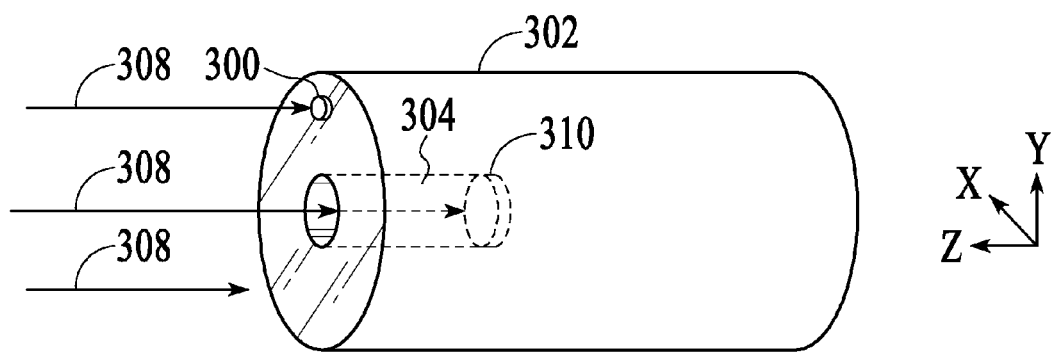
Figure 29C:
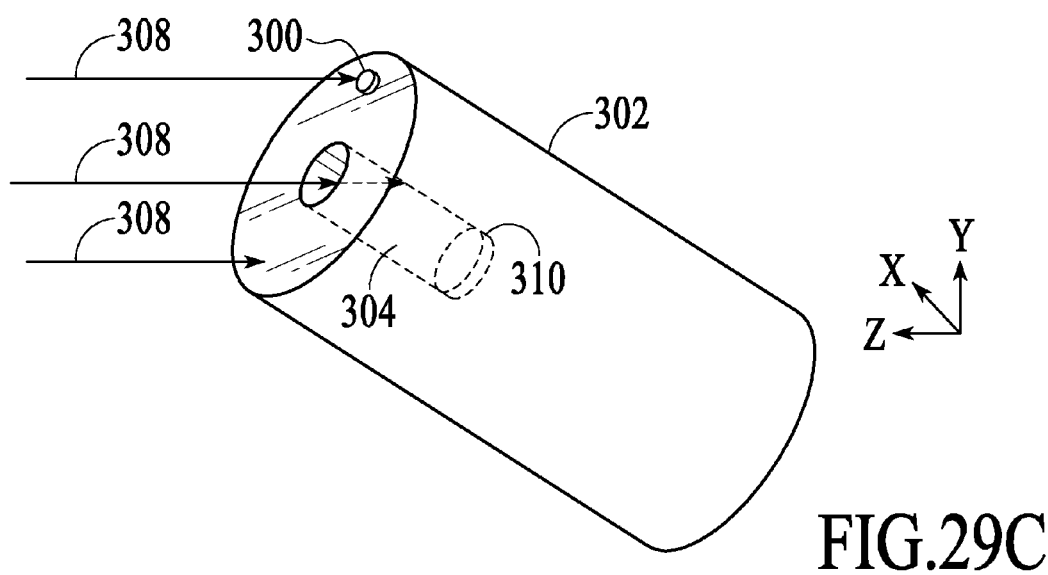

In an embodiment, an additional retroreflector that is not subject to the orientation-specific structural feature of the pointing device is placed on a surface of the pointing device to enable position tracking. FIGS. 29A-29C depict an embodiment of a pointing device 302 that is similar to the pointing device described with reference to FIGS. 28A-28C except that it includes a retroreflector 300 that is not subject to the orientation-specific structural feature of the pointing device. Referring to FIG. 29A, the additional retroreflector is located on the outer surface 314 of the pointing device. When the pointing device is oriented as shown in FIG. 29B, both the retroreflector 300 on the outer surface of the pointing device and the retroreflector 310 in the cavity 304 of the pointing device are illuminated by the beam 308 of light. Because both retroreflectors are illuminated, they will both be represented in the difference image. When the pointing device is oriented as shown in FIG. 29C, the retroreflector 300 on the outer surface of the pointing device is illuminated but the retroreflector 310 in the cavity is not illuminated because the beam of light is blocked by a structural feature of the pointing device. Even though the orientation of the pointing device in FIG. 29C prevents the retroreflector 310 within the cavity from being illuminated, the retroreflector 300 on the outer surface of the pointing device is still illuminated and can be used for position tracking. The dimensions and wall angles of the cavity can be configured to set the field of view of the retroreflector.

Figure 30A:
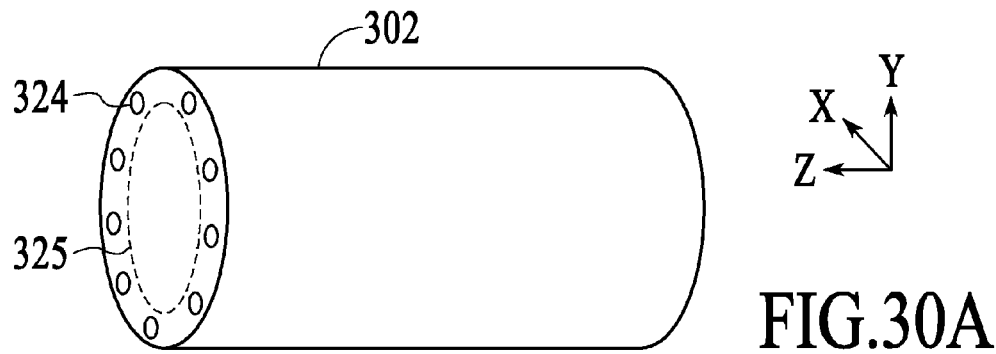
FIGS. 30A and 30B depict an embodiment of a pointing device in which multiple retroreflectors are used in conjunction with orientation-specific structural features to enable the generation of more detailed orientation information.
Figure 30B:
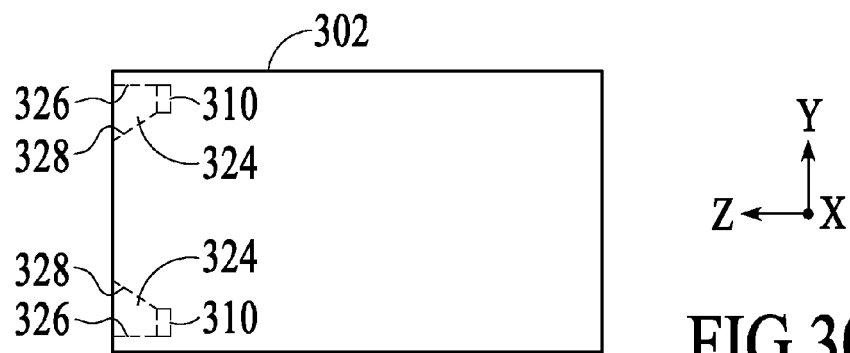

FIGS. 30A and 30B depict an embodiment of a pointing device 302 in which multiple retroreflectors 310 are used in conjunction with orientation-specific structural features 324 to enable the generation of orientation information. In the embodiment of FIGS. 30A and 30B, multiple retroreflectors 310 are located in respective cavities. The cavities are arranged in a circle 325. Each cavity has its own orientation-specific sensitivity and the orientation of the pointing device can be determined from the locations of the retroreflectors that are represented in the difference image. Referring to FIG. 30B, the orientation-specific sensitivity of the cavities is achieved by forming cavity walls 326 and 328 at different angles. As depicted in FIG. 30B, the walls 328 of the cavities closer to the center of the circle are at a larger angle relative to a line perpendicular to the surface 314 of the pointing device than the walls 326 further from the center.

Figure 31A:
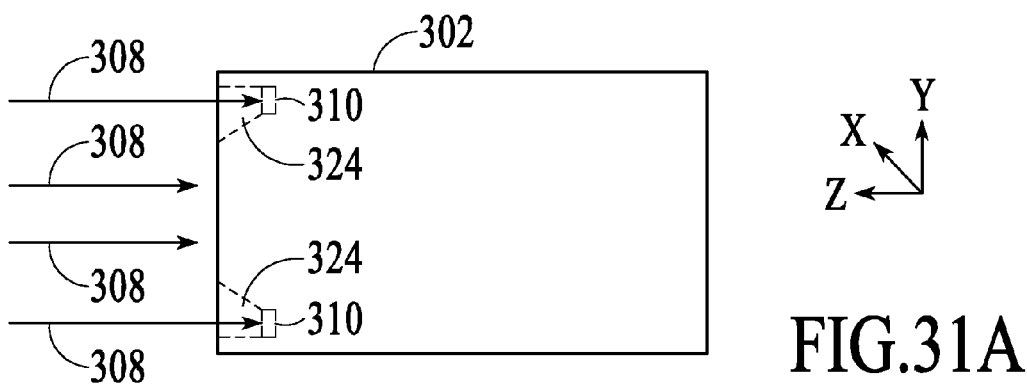
FIG. 31A depicts a side view of the pointing device from FIGS. 30A and 30B in which the cavities and retroreflectors are oriented relative to a beam of light such that all of the retroreflectors are illuminated.
Figure 31B:
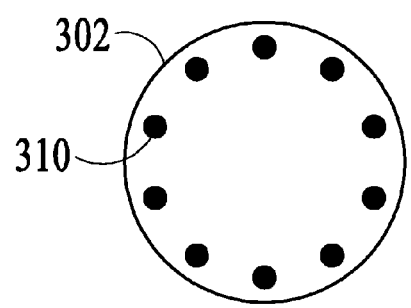
FIG. 31B is a front view of the pointing device from FIG. 31A in which the illumination of all of the retroreflectors is represented by the filled in dark circles.

FIG. 31A depicts a side view of the pointing device 302 from FIGS. 30A and 30B in which the cavities 324 and retroreflectors 310 are oriented relative to a beam 308 of light such that all of the retroreflectors are illuminated. FIG. 31B is a front view of the pointing device from FIG. 31A in which the illumination of all of the retroreflectors is represented by the filled in dark circles. From the illumination pattern in FIG. 31B, it can be inferred that all of the cavities and retroreflectors are aligned with the beam of light. FIG. 32A depicts a side view of the pointing device from FIGS. 30A and 30B in which the cavities and retroreflectors are oriented relative to the beam 308 of light such that only some of the retroreflectors are illuminated. FIG. 32B is a front view of the pointing device from FIG. 32A in which the illuminated retroreflectors are represented by filled in dark circles and the non-illuminated retroreflectors are represented by the un-filled in circles. The orientation of the pointing device can be determined from the identity of the illuminated retroreflectors. In this embodiment, a non-illuminated retroreflector indicates that the pointing device is oriented such that the non-illuminated retroreflector has rotated towards the image collection system. Because the retroreflectors are located on the pointing device around the perimeter of circle 325, the orientation of the pointing device relative to the x and y axes can be determined. In some orientations, retroreflectors may be partially illuminated. Additional orientation information can be obtained from, for example, the shapes and/or intensity values of the image information related to the partially illuminated retroreflectors.

In another embodiment, the orientation-specific structural feature is a slot that extends into a device such as a pointing device. A retroreflector is located within the slot. Because of the shape of the slot, the field of view of the retroreflector is larger in one direction than in the other direction. Specifically, the field of view in the direction parallel to the slot is larger than the field of view in the direction perpendicular to the slot. The differences in the field of view allow the retroreflector to be illuminated over a larger range in the parallel direction and a smaller range in the perpendicular direction. A change in orientation in the perpendicular direction will be indicated by the partial or complete disappearance of the retroreflector in the difference image. Characteristics of the field of view of a retroreflector within a slot are a function of the width and depth of the slot. The dimensions and configuration of the orientation-specific structural feature can be set to achieve the desired response.

Multiple techniques for generating orientation information can be combined to enable the generation of more detailed orientation information. FIGS. 33A and 33B depict an example of a pointing device 302 that utilizes an orientation-specific pattern of retroreflectors 300 as described with reference to FIGS. 26A and 26B in conjunction with a pattern of retroreflectors 310 that is integrated into orientation-specific features 324 of the pointing device as described with reference to FIGS. 30A-32B. The configuration of FIGS. 33A and 33B enables the generation of orientation information in terms of rotation around the x, y, and z axes. In particular, the orientation-specific pattern of retroreflectors 300 on the surface 314 of the pointing device enables the generation of orientation information in terms of rotation around the z axis and the pattern of retroreflectors 310 located in the cavities of the pointing device enables the generation of orientation information in terms of rotation around the x and y axes.

Figure 34:
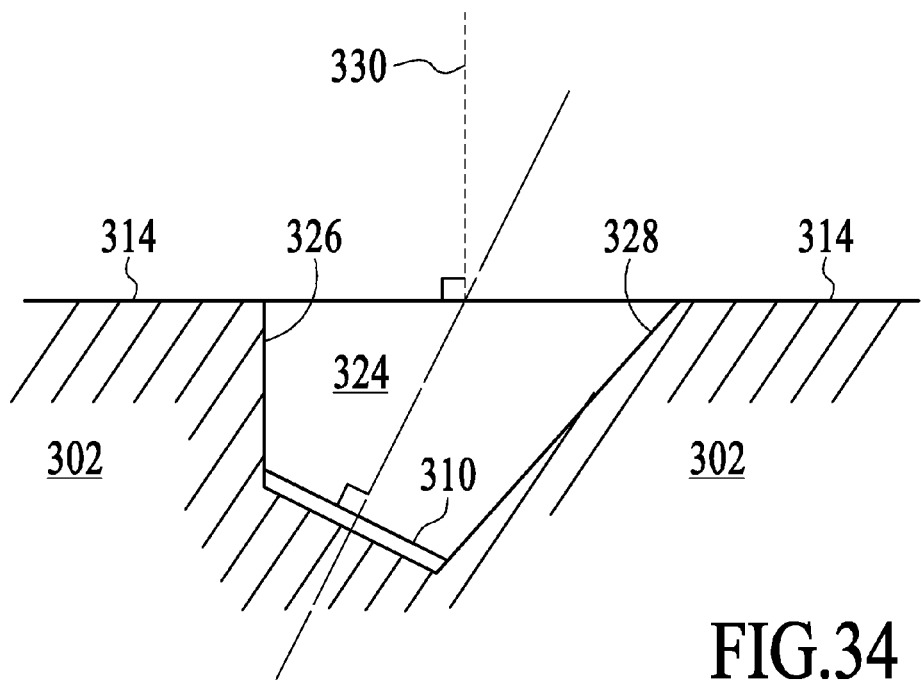
FIG. 34 depicts an embodiment of a cavity in a pointing device and a retroreflector that is attached at the bottom of the cavity.

FIG. 34 depicts an embodiment of a cavity 324 in a pointing device 302 and a retroreflector 310 located at the bottom of the cavity. The cavity has at least two walls 326 and 328 that have different angles relative to the axis 330 perpendicular to the surface 314 of the pointing device 302. In particular, one of the walls 326 of the cavity is at an angle that is near parallel to axis 330 and the other wall 328 of the cavity is at an angle that is non-parallel to axis 330. The angles of the walls and the depth of the cavity define the field of view of the retroreflector. Because the angles of the walls are different, the retroreflector has different fields of view at different orientations. The different fields of view are utilized as described above to give an indication of orientation. Although FIG. 34 depicts an example of a cavity, other cavity configurations are possible.

Although the cavities depicted in FIGS. 30A-33B are symmetrically oriented about a circle, the cavities could alternatively be located in a different pattern. Additionally, the field of view of the cavities can be in a different, for example, more random configuration.

Figure 35:
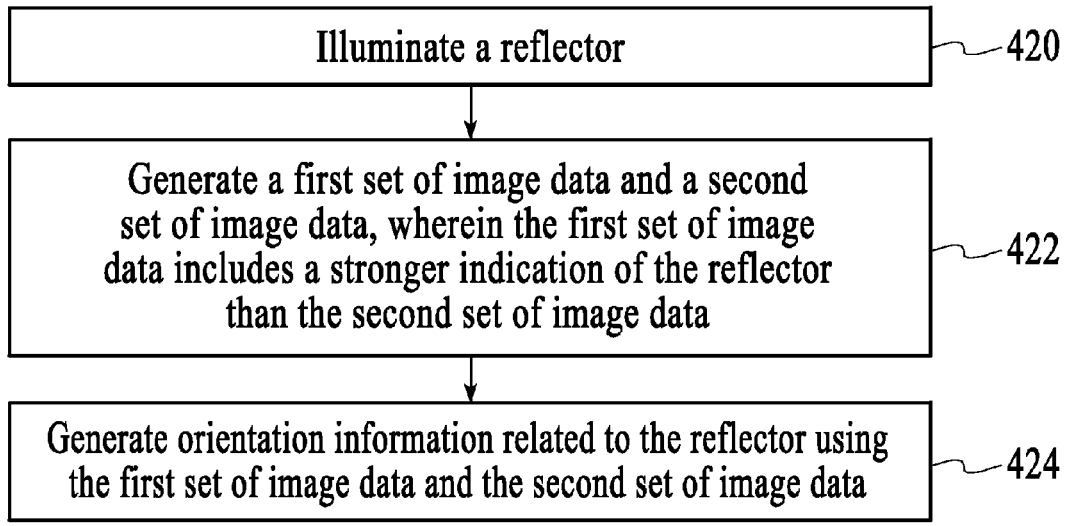
FIG. 35 depicts a process flow diagram of a method for generating orientation information.

FIG. 35 depicts a process flow diagram of a method for generating orientation information. At block 420, a reflector is illuminated. At block 422, a first set of image data and a second set of image data are generated, wherein the first set of image data includes a stronger indication of the reflector than the second set of image data. At block 424, orientation information related to the reflector is generated using the first set of image data and the second set of image data.

Figure 36:
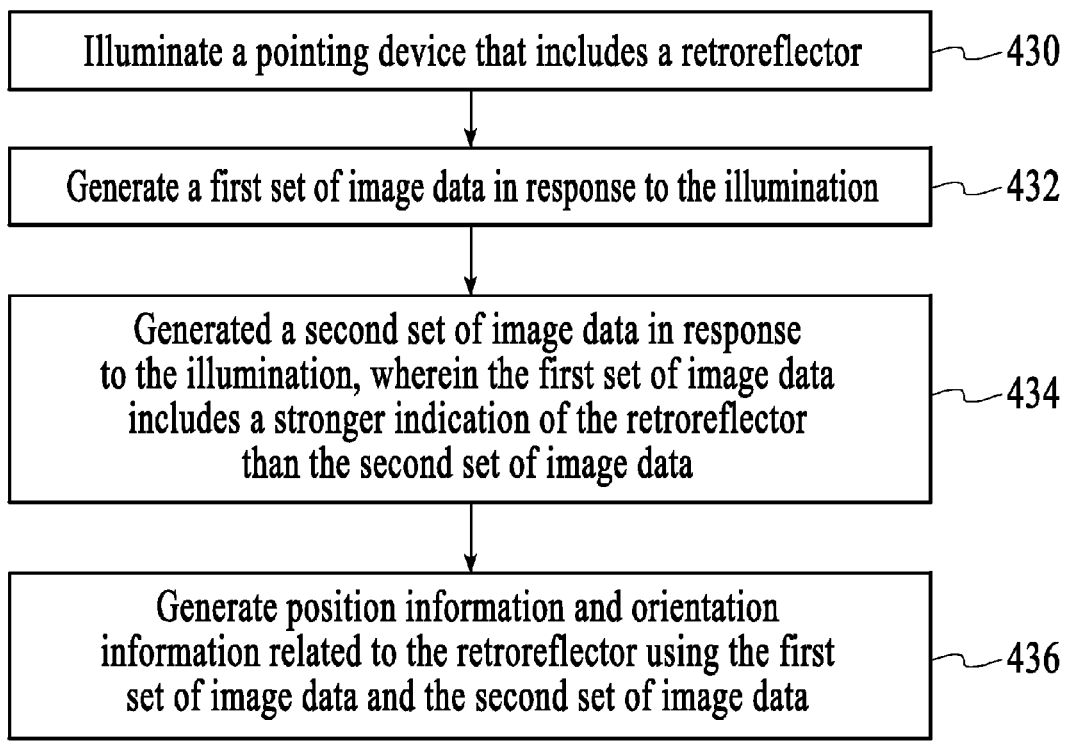
FIG. 36 depicts a process flow diagram of a method for generating position information and orientation information.

FIG. 36 depicts a process flow diagram of a method for generating position information and orientation information. At block 430, a pointing device that includes a retroreflector is illuminated. At block 432, a first set of image data is generated in response to the illumination. At block 434, a second set of image data is generated in response to the illumination. At block 436, position information and orientation information related to the retroreflector is generated using the first set of image data and the second set of image data.

Although some exemplary orientation-specific shapes and patterns of retroreflectors are described above as examples of orientation-specific characteristics, other orientation-specific configurations are possible. For example, retroreflectors in a line, a pattern of retroreflector lines, or the size of retroreflectors can be used to achieve an orientation-specific characteristic. Additionally, although some exemplary orientation-specific structural features are described above, other orientation-specific structural features are possible.

Although the retroreflectors are described as being attached to a pointing device, the retroreflectors could be integrated with some other objects. For example, the retroreflectors can be attached to clothing, to parts of the body, or any other object whose position and/or orientation is of interest.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for generating position information, the method comprising:

illuminating a reflector using two light sources that generate light of different wavelengths;

generating a first set of image data and a second set of image data using two imagers, wherein the first set of image data includes a stronger indication of the reflector than the second set of image data; and generating, using a processor, position information related to the reflector using the first set of image data and the second set of image data, wherein generating position information comprises taking the difference between the first set of image data and the second set of image data, wherein taking the difference between the first set of image data and the second set of image data comprises taking the difference between corresponding data points of the first and second sets of image data such that most of the corresponding data points from the first and second sets of image data cancel each other out except for data points that correspond to the reflector;

wherein the processor is configured to perform stereo processing; and wherein the two imagers are oriented in an epipolar geometry relative to the reflector.

2. The method of claim 1 wherein the first set of image data is generated in response to light that has a first illumination angle and the second set of image data is generated in response to light that has a second illumination, wherein the first illumination angle and the second illumination angle are similar.

3. The method of claim 1 wherein generating the first set of image data and the second set of image data includes filtering light with a hybrid filter.

4. The method of claim 1 further including filtering the light that illuminates the reflector before generating the first set of image data and the second set of image data.

5. A system for generating position information, the system comprising:
   a reflector;
   an image collection system configured to generate a first set of image data and a second set of image data, wherein the first set of image data includes a stronger indication of the reflector than the second set of image data; and
   a processor configured to use the first set of image data and the second set of image data to generate position information related to the reflector, wherein the processor is configured to take the difference between the first set of image data and the second set of image data; and
   wherein taking the difference between the first set of image data and the second set of image data comprises taking the difference between corresponding data points of the first and second sets of image data such that most of the corresponding data points from the first and second sets of image data cancel each other out except for data points that correspond to the reflector;
   wherein the image collection system comprises two imagers and two light sources that generate light of different wavelengths;
   wherein the processor is configured to perform stereo processing; and
   wherein the two imagers are oriented in an epipolar geometry relative to the retroreflector.

6. The system of claim 5 wherein the reflector is a retroreflector that is integrated into a pointing device.

7. The system of claim 5 wherein taking the difference between the first set of image data and the second set of image data comprises comparing difference values to a difference threshold and including in difference image data only those values which exceed the difference threshold.

8. The system of claim 5 wherein the processor is configured to compare a difference image, which results from taking the difference between the first set of image data and the second set of image data, to known image information.

* * * * *